(12) United States Patent
Kim et al.

(10) Patent No.: US 10,750,914 B2
(45) Date of Patent: Aug. 25, 2020

(54) DUST COLLECTING APPARATUS

(71) Applicant: LG ELECTRONICS INC., Seoul (KR)

(72) Inventors: Youngho Kim, Seoul (KR); Hoikil Jeong, Seoul (KR); Heonpyeong Ji, Seoul (KR); Kangjin Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 78 days.

(21) Appl. No.: 15/981,164

(22) Filed: May 16, 2018

(65) Prior Publication Data

US 2018/0263445 A1 Sep. 20, 2018

Related U.S. Application Data

(62) Division of application No. 15/000,980, filed on Jan. 19, 2016, now Pat. No. 10,123,673.

(30) Foreign Application Priority Data

Jan. 16, 2015 (KR) .................. 10-2015-0007745

(51) Int. Cl.
*B01D 50/00* (2006.01)
*A47L 9/10* (2006.01)
(Continued)

(52) U.S. Cl.
CPC ............. *A47L 9/108* (2013.01); *A47L 9/1633* (2013.01); *B01D 45/12* (2013.01); *B01D 45/16* (2013.01);
(Continued)

(58) Field of Classification Search
CPC .......... A47L 9/108; A47L 9/1633; A47L 9/12; A47L 9/1625; A47L 9/1641;
(Continued)

(56) References Cited

U.S. PATENT DOCUMENTS 2,553,175 A 5/1951 Davenport et al.
3,130,157 A 4/1964 Kelsall
(Continued)

FOREIGN PATENT DOCUMENTS

JP 2009-056039 3/2009
KR 10-0398684 9/2003
(Continued)

OTHER PUBLICATIONS

Korean Office Action issued in Application No. 10-2015-0007745 dated Nov. 30, 2015.
(Continued)

*Primary Examiner* — Dung H Bui
(74) *Attorney, Agent, or Firm* — KED & Associates, LLP

(57) ABSTRACT

A dust collecting apparatus includes a dust separation unit to separate dust from suctioned air; a dust storage unit to store the dust separated in the dust separation unit; a pressing member to compress the dust stored in the dust storage unit, and having a pressing plate support part, and a pressing plate supported by the pressing plate support part; a fixing member disposed between an inner circumferential surface of the dust storage unit and the pressing plate support part; and a path formed by a part of the fixing member, located between the pressing plate support part and the inner circumferential surface of the dust storage unit, and through which the air between the pressing plate and the fixing member passes, wherein one or more holes through which the air between the pressing plate and the fixing member passes are formed at the pressing plate.

9 Claims, 18 Drawing Sheets

(51) Int. Cl.
    *B01D 45/16*     (2006.01)
    *A47L 9/16*     (2006.01)
    *B01D 45/12*     (2006.01)
    *B01D 46/24*     (2006.01)

(52) U.S. Cl.
    CPC ........ *B01D 46/2411* (2013.01); *B01D 50/002* (2013.01); *A47L 9/1625* (2013.01); *A47L 9/1683* (2013.01)

(58) Field of Classification Search
    CPC ..... A47L 9/1683; B01D 45/16; B01D 50/002; B01D 45/12; B01D 46/2411
    See application file for complete search history.

(56) References Cited

U.S. PATENT DOCUMENTS

| | | | |
|---|---|---|---|
| 3,822,533 A | 7/1974 | Oranje | |
| 3,988,133 A | 10/1976 | Schady | |
| 6,192,550 B1 | 2/2001 | Hamada | |
| 7,547,337 B2 | 6/2009 | Oh | |
| 7,776,120 B2 | 8/2010 | Conrad | |
| 7,867,307 B2 | 1/2011 | Bates et al. | |
| 7,958,598 B2 | 6/2011 | Yun et al. | |
| 7,976,597 B2 | 7/2011 | Smith | |
| 7,992,252 B2 | 8/2011 | Park et al. | |
| 7,998,234 B2 | 8/2011 | Hwang et al. | |
| 8,012,250 B2 | 9/2011 | Hwang et al. | |
| 8,083,824 B2 | 12/2011 | Fujiyama | |
| 8,151,409 B2 | 4/2012 | Ha et al. | |
| 8,281,455 B2* | 10/2012 | Hwang | A47L 5/365 15/300.1 |
| 8,370,992 B2* | 2/2013 | Chong | A47L 9/20 15/320 |
| 8,375,508 B2 | 2/2013 | Conrad | |
| 8,404,034 B2* | 3/2013 | Hwang | A47L 5/365 55/428 |
| 8,474,092 B2* | 7/2013 | Chong | A47L 9/108 15/347 |
| 8,544,143 B2 | 10/2013 | Hwang et al. | |
| 8,679,211 B1 | 3/2014 | Makarov | |
| 8,707,511 B2 | 4/2014 | Horne | |
| 8,713,752 B2 | 5/2014 | Kang | |
| 8,978,197 B2 | 3/2015 | Kang | |
| 9,226,630 B2 | 1/2016 | Chong et al. | |
| 9,301,662 B2 | 4/2016 | Conrad | |
| 9,439,547 B2 | 9/2016 | Makarov | |
| 9,668,629 B2 | 6/2017 | Hyun et al. | |
| 9,943,202 B2* | 4/2018 | Eo | A47L 9/1616 |
| 10,028,630 B2 | 7/2018 | Cho | |
| 2003/0046910 A1 | 3/2003 | Lee | |
| 2003/0121121 A1 | 7/2003 | Nakai | |
| 2005/0183233 A1* | 8/2005 | Lin | A47L 5/38 15/352 |
| 2005/0198767 A1 | 9/2005 | Kang et al. | |
| 2006/0042206 A1 | 3/2006 | Arnold | |
| 2006/0080947 A1 | 4/2006 | Lee | |
| 2006/0123590 A1 | 6/2006 | Fester et al. | |
| 2006/0123749 A1* | 6/2006 | Park | A47L 9/108 55/428 |
| 2007/0067944 A1 | 3/2007 | Kitamura | |
| 2007/0266518 A1* | 11/2007 | Hoyle | A47L 13/59 15/261 |
| 2008/0023036 A1 | 1/2008 | Ha et al. | |
| 2008/0047091 A1 | 2/2008 | Nguyen | |
| 2008/0134462 A1 | 6/2008 | Jansen | |
| 2008/0172824 A1 | 7/2008 | Yun et al. | |
| 2008/0172993 A1 | 7/2008 | Yun et al. | |
| 2008/0172994 A1 | 7/2008 | Courtney et al. | |
| 2008/0184681 A1 | 8/2008 | Oh et al. | |
| 2008/0256911 A1 | 10/2008 | Oh et al. | |
| 2008/0264016 A1 | 10/2008 | Oh et al. | |
| 2008/0264017 A1 | 10/2008 | Oh | |
| 2008/0271284 A1 | 11/2008 | Wood | |
| 2009/0031524 A1 | 2/2009 | Courtney et al. | |
| 2009/0193771 A1 | 8/2009 | Oh et al. | |
| 2009/0241286 A1 | 10/2009 | Hwang et al. | |
| 2009/0249578 A1 | 10/2009 | Hwang et al. | |
| 2009/0255083 A1 | 10/2009 | Hwang et al. | |
| 2009/0266382 A1 | 10/2009 | Hwang et al. | |
| 2009/0293224 A1 | 12/2009 | Hyun et al. | |
| 2009/0300871 A1 | 12/2009 | Seo | |
| 2009/0313959 A1 | 12/2009 | Gomiciaga-Pereda et al. | |
| 2010/0005617 A1 | 1/2010 | Hyun et al. | |
| 2010/0218338 A1 | 9/2010 | McLeod | |
| 2010/0263161 A1 | 10/2010 | Lee et al. | |
| 2011/0000047 A1 | 1/2011 | Ji et al. | |
| 2011/0099749 A1 | 5/2011 | Chong et al. | |
| 2011/0099750 A1 | 5/2011 | Chong et al. | |
| 2011/0203613 A1* | 8/2011 | Roberts | A47L 13/58 134/10 |
| 2011/0209303 A1 | 9/2011 | Kim | |
| 2012/0011679 A1 | 1/2012 | Chong et al. | |
| 2012/0030895 A1 | 2/2012 | Chong et al. | |
| 2012/0096669 A1* | 4/2012 | Treacy | A47L 13/59 15/260 |
| 2012/0102671 A1 | 5/2012 | Kwon | |
| 2012/0167336 A1 | 7/2012 | Tran | |
| 2012/0180253 A1 | 7/2012 | Hwang et al. | |
| 2012/0210537 A1 | 8/2012 | Makarov et al. | |
| 2013/0091661 A1 | 4/2013 | Smith | |
| 2013/0160232 A1 | 6/2013 | Peace | |
| 2013/0160233 A1 | 6/2013 | Peace | |
| 2014/0090341 A1 | 4/2014 | Chen | |
| 2014/0196605 A1 | 7/2014 | Morgan | |
| 2014/0263104 A1* | 9/2014 | Kepner | A47L 13/58 210/791 |
| 2015/0107047 A1 | 4/2015 | Hyun et al. | |
| 2015/0190030 A1* | 7/2015 | Johnson | A47L 13/59 15/261 |
| 2015/0216383 A1 | 8/2015 | Bower et al. | |
| 2016/0088988 A1 | 3/2016 | Eo et al. | |
| 2016/0088989 A1 | 3/2016 | Hyun et al. | |
| 2016/0113463 A1 | 4/2016 | Hyun et al. | |
| 2016/0150929 A1 | 6/2016 | Shin et al. | |
| 2016/0150931 A1 | 6/2016 | Kim et al. | |
| 2016/0367098 A1 | 12/2016 | Tran | |

FOREIGN PATENT DOCUMENTS

| | | |
|---|---|---|
| KR | 10-0718282 | 5/2007 |
| KR | 10-0876700 | 12/2008 |
| KR | 10-2011-0048511 | 5/2011 |
| KR | 10-1139564 | 4/2012 |

OTHER PUBLICATIONS

United States Office Action dated Feb. 14, 2018 issued in U.S. Appl. No. 15/000,980.

U.S. Office Action dated Nov. 8, 2019 issued in U.S. Appl. No. 15/981,192.

United States Office Action dated Dec. 6, 2019 issued in U.S. Appl. No. 15/981,174.

United States Office Action dated Dec. 6, 2019 issued in U.S. Appl. No. 15/981,178.

United States Office Action dated Apr. 20, 2020 issued in U.S. Appl. No. 15/981,178.

* cited by examiner

DUST COLLECTING APPARATUS

CROSS-REFERENCE TO RELATED APPLICATIONS

This application is a Divisional Application of prior U.S. patent application Ser. No. 15/000,980 filed Jan. 19, 2016, which claims priority under 35 U.S.C. § 119 to Korean Application No. 10-2015-0007745, filed in Korea on Jan. 16, 2015, whose entire disclosures are hereby incorporated by reference.

BACKGROUND

1. Field

A dust collecting apparatus are disclosed herein.

2. Background

Generally, a vacuum cleaner is an apparatus which suctions dust and foreign substances scattered on a surface to be cleaned using a suction motor installed inside a main body of the cleaner and then filters the dust and foreign substances in the main body.

The vacuum cleaner may be classified into an upright type in which a suction nozzle as a suction port is integrally formed with the main body, and a canister type in which the suction nozzle is in communication with the main body through a connection tube.

Meanwhile, an upright type vacuum cleaner is disclosed in Korean Unexamined Patent Application Publication No. 2011-0048511 (published on Nov. 5, 2011).

SUMMARY

The present invention is directed to providing a dust collecting apparatus which has enhanced dust separation performance, and is able to compress dust.

Also, the present invention is directed to providing a dust collecting apparatus which minimizes a phenomenon that dust stored in a dust storage unit backflows to a dust separation unit.

One aspect of the present invention provides a dust collecting apparatus including a dust separation unit configured to separate dust from suctioned air; a dust storage unit configured to store the dust separated in the dust separation unit; a pressing member configured to compress the dust stored in the dust storage unit, and having a pressing plate support part, and a pressing plate supported by the pressing plate support part; a fixing member disposed between an inner circumferential surface of the dust storage unit and the pressing plate support part; and a path formed by a part of the fixing member, located between the pressing plate support part and the inner circumferential surface of the dust storage unit, and through which the air between the pressing plate and the fixing member passes, wherein one or more holes through which the air between the pressing plate and the fixing member passes are formed at the pressing plate.

Another aspect of the present invention provides a dust collecting apparatus including a dust separation unit configured to separate dust from suctioned air; a filter unit configured to filter the air separated from the dust in the dust separation unit; a dust storage unit configured to store the dust separated from the air in the dust separation unit, and of which an upper portion has a diameter larger than a diameter of a lower portion of the dust separation unit; a connection part configured to connect the dust storage unit with the dust separation unit; a pressing member configured to compress the dust stored in the dust storage unit, and having a pressing plate support part, and a pressing plate supported by the pressing plate support part; a fixing member disposed between an inner circumferential surface of the dust storage unit and the pressing plate support part; and a dust movement guide configured to guide movement of the dust so that the dust separated in the dust separation unit smoothly falls down into the dust storage unit, wherein at least a part of the dust movement guide is located lower than the connection part.

Still another aspect of the present invention provides a dust collecting apparatus including a first dust separation unit configured to primarily separate dust from suctioned air; a first dust storage unit configured to store the dust separated in the first dust separation unit; a pressing member configured to compress the dust stored in the first dust storage unit, and having a pressing plate support part, and a pressing plate supported by the pressing plate support part; a fixing member disposed between an inner circumferential surface of the first dust storage unit and the pressing plate support part; a second dust separation unit configured to separate again the dust from the air passed through a dust separation process in the first dust separation unit; and a flow restriction part configured to protrude from the first dust storage unit and to restrict rising of the air in the first dust storage unit.

BRIEF DESCRIPTION OF THE DRAWINGS

Embodiments will be described in detail with reference to the following drawings in which like reference numerals refer to like elements, and wherein.

DETAILED DESCRIPTION

Reference will now be made in detail to the embodiments of the present disclosure, examples of which are illustrated in the accompanying drawings.

In the following detailed description of the preferred embodiments, reference is made to the accompanying drawings that form a part hereof, and in which is shown by way of illustration specific preferred embodiments in which the invention may be practiced. These embodiments are described in sufficient detail to enable those skilled in the art to practice the invention, and it is understood that other embodiments may be utilized and that logical structural, mechanical, electrical, and chemical changes may be made without departing from the spirit or scope of the invention. To avoid detail not necessary to enable those skilled in the art to practice the invention, the description may omit certain information known to those skilled in the art. The following detailed description is, therefore, not to be taken in a limiting sense.

Also, in the description of embodiments, terms such as first, second, A, B, (a), (b) or the like may be used herein when describing components of the present invention. Each of these terminologies is not used to define an essence, order or sequence of a corresponding component but used merely to distinguish the corresponding component from other component(s). It should be noted that if it is described in the specification that one component is "connected," "coupled" or "joined" to another component, the former may be directly "connected," "coupled," and "joined" to the latter or "connected", "coupled", and "joined" to the latter via another component.

Figure 1:
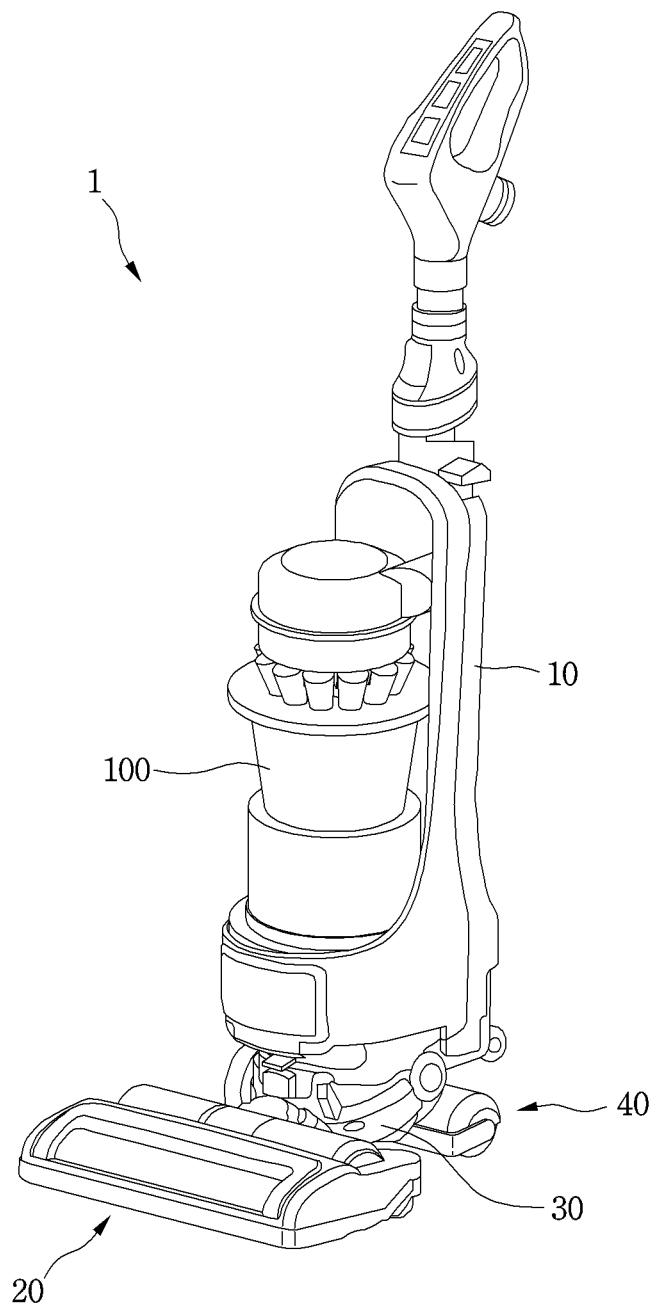
FIG. 1 is a perspective view of a vacuum cleaner according to a first embodiment of the present invention.

FIG. 1 is a perspective view of a vacuum cleaner according to a first embodiment of the present invention.

FIG. 1 illustrates an example in which a dust collecting apparatus is installed at an upright type vacuum cleaner. However, a dust collecting apparatus of the present invention may be installed at a canister type vacuum cleaner.

Referring to FIG. 1, a vacuum cleaner 1 according to a first embodiment of the present invention may include a cleaner body 10 which has a suction motor generating a suction force, and a suction nozzle 20 which is in communication with the cleaner body 10 and suctions air containing dust.

Also, the vacuum cleaner 1 may further include a supporter 30 which enables a position of the cleaner body 10 with respect to the suction nozzle 20 to be varied, and a wheel assembly 40 which is rotatably connected to the supporter 30.

Although not shown, an air path through which the air flows may be provided inside the supporter 30. Therefore, the air suctioned through the suction nozzle 20 may flow to the cleaner body 10 via the supporter 30.

The vacuum cleaner 1 may further include a dust collecting apparatus 100 which is separably installed at the cleaner body 10.

The dust collecting apparatus 100 serves to separate the dust from the air suctioned into the cleaner body 10 and to store the separated dust.

Hereinafter, the dust collecting apparatus 100 will be described in detail.

Figure 2:
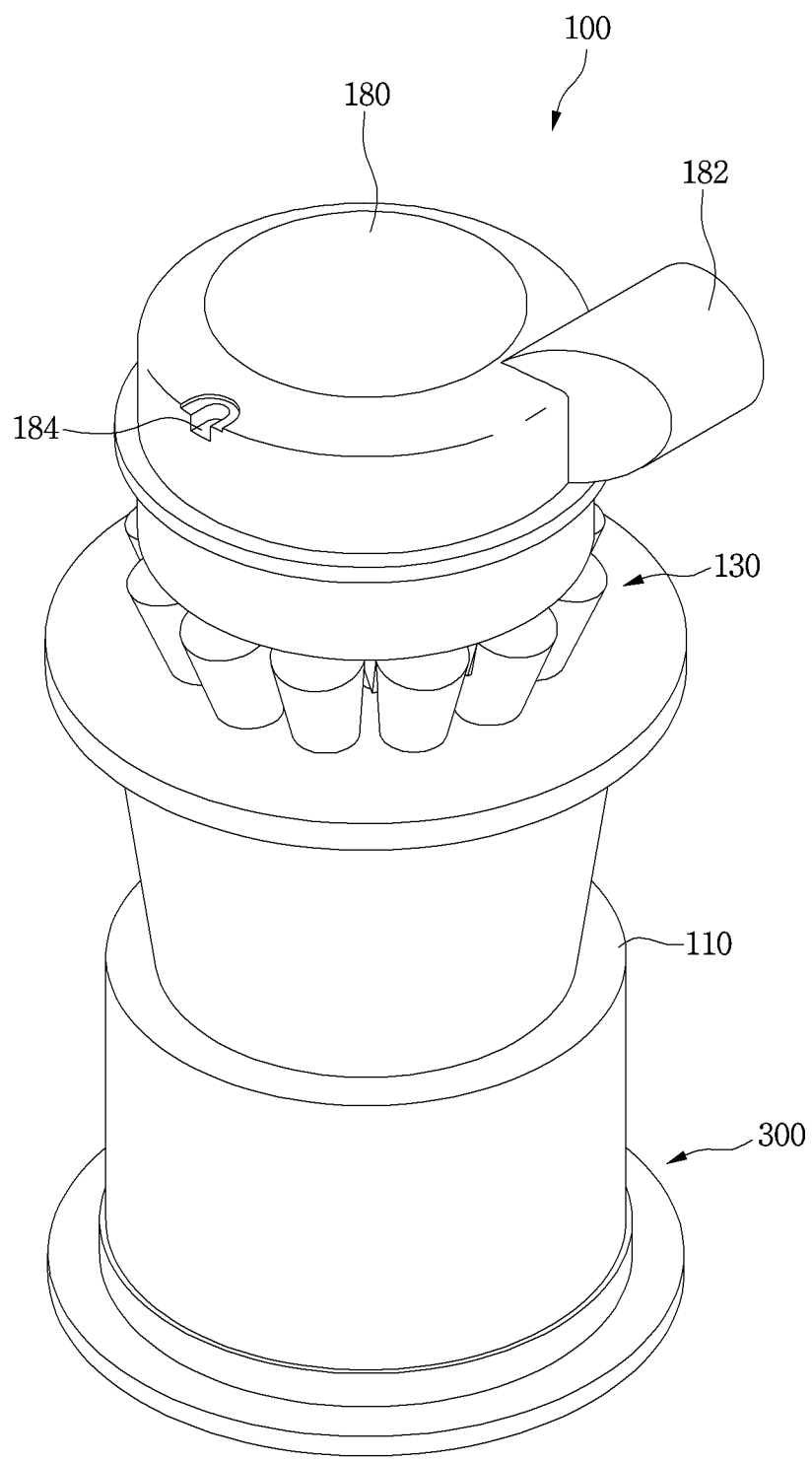
FIG. 2 is a perspective view of a dust collecting apparatus according to the first embodiment of the present invention.
Figure 3:
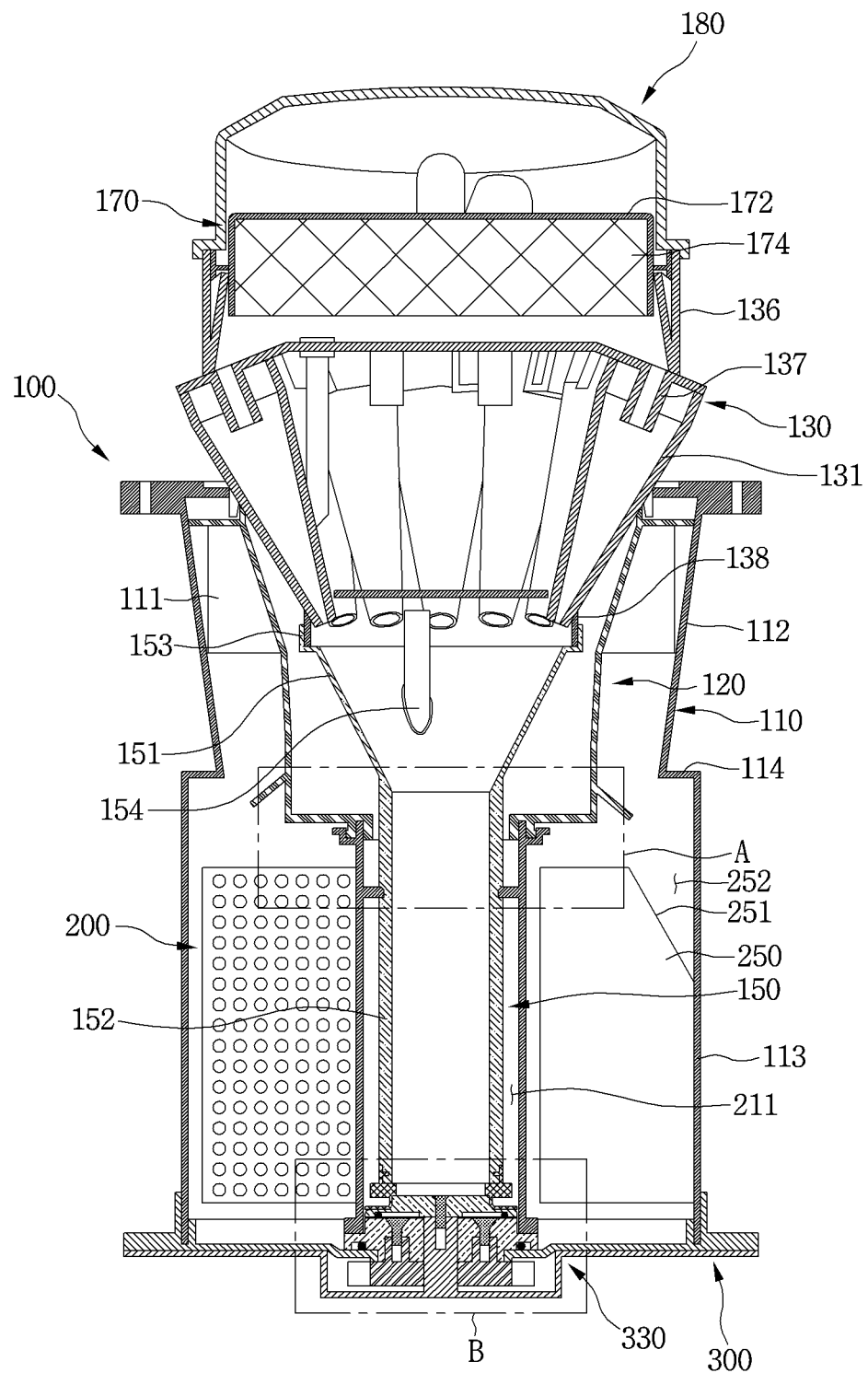
FIG. 3 is a cross-sectional view of the dust collecting apparatus of FIG. 2.
Figure 4:
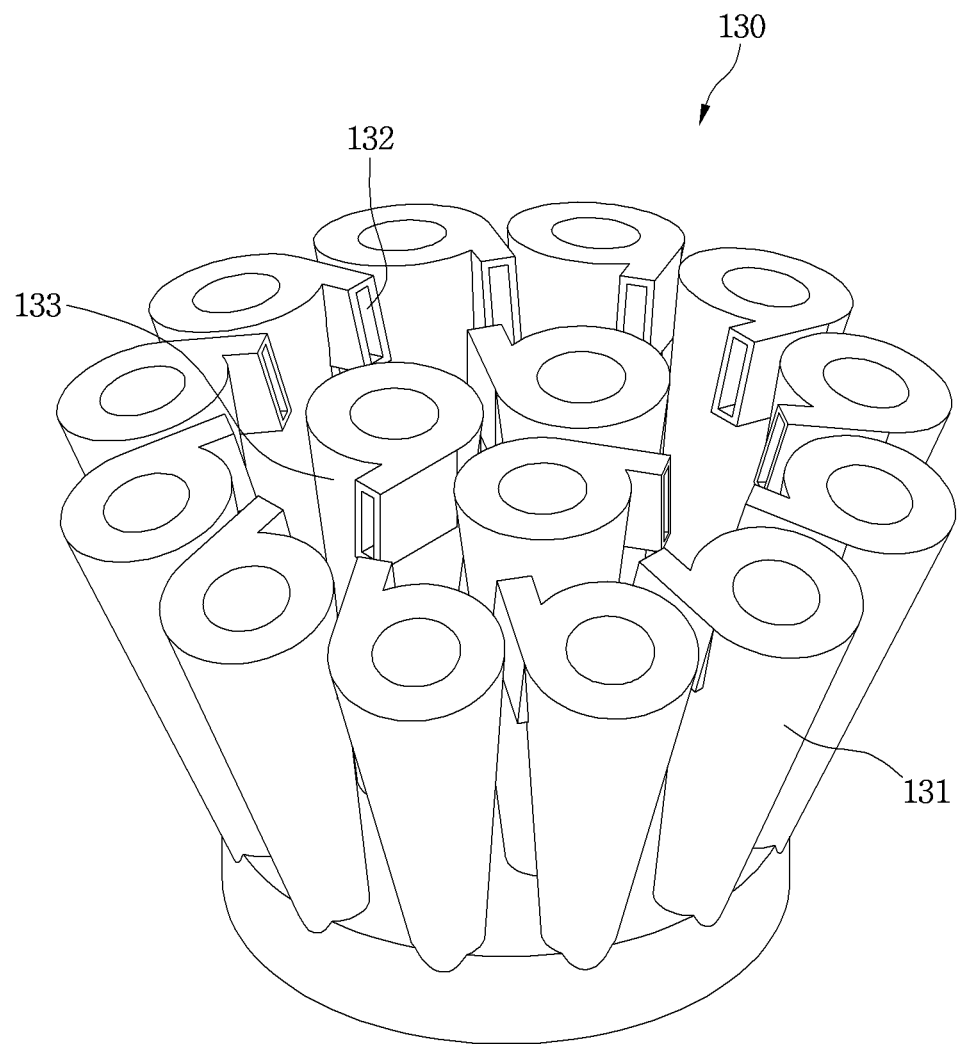
FIG. 4 is a partial perspective view of a second dust separation unit according to the first embodiment of the present invention.
Figure 5:
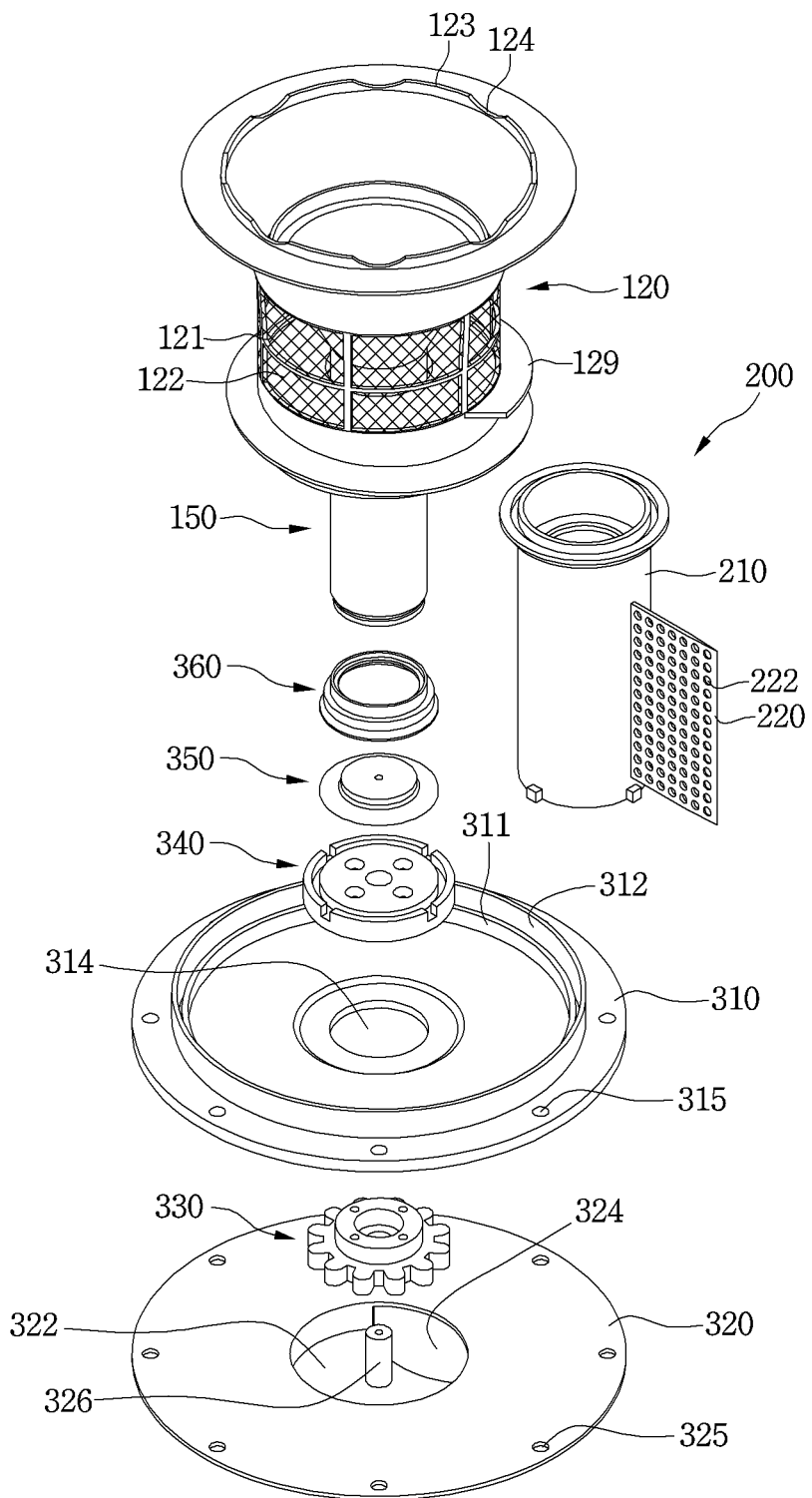
FIG. 5 is an exploded perspective view of the dust collecting apparatus according to the first embodiment of the present invention.
Figure 6:
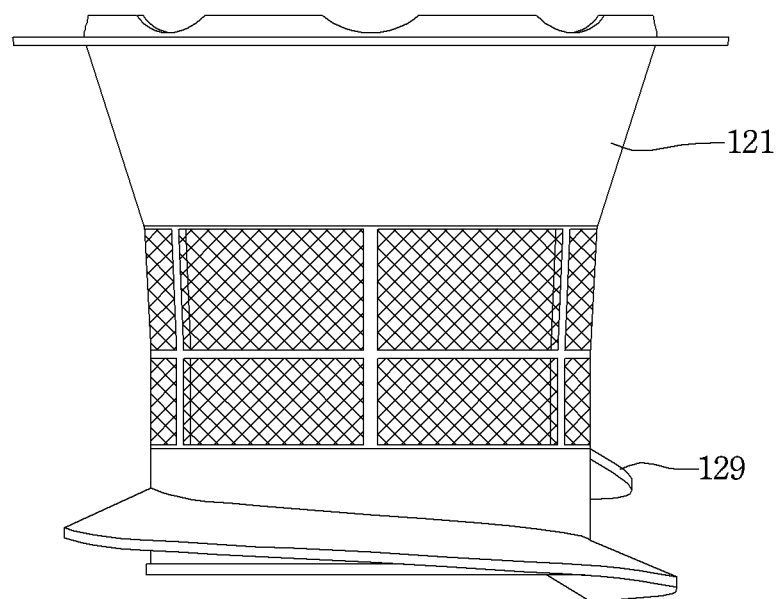
FIG. 6 is a view of a filter unit according to the first embodiment of the present invention.

FIG. 2 is a perspective view of the dust collecting apparatus according to the first embodiment of the present invention, FIG. 3 is a cross-sectional view of the dust collecting apparatus of FIG. 2, FIG. 4 is a partial perspective view of a second dust separation unit according to the first embodiment of the present invention, FIG. 5 is an exploded perspective view of the dust collecting apparatus according to the first embodiment of the present invention, and FIG. 6 is a view of a filter unit according to the first embodiment of the present invention.

FIG. 5 illustrates an exploded perspective view of the dust collecting apparatus in which a second dust separation unit, a filter device and an exhaust cover are omitted.

Referring to FIGS. 2 to 6, the dust collecting apparatus 100 may include a dust collecting body 110. The dust collecting body 110 may include a first dust separation unit 112 having a first suction port 111, and a first dust storage unit 113 which stores the dust separated by the first dust separation unit 112.

The first dust storage unit 113 may be integrally formed with the first dust separation unit 112, or may be coupled to the first dust separation unit 112 by a coupling member.

For example, the first dust separation unit 112 may be formed in a truncated cone shape, and the first dust storage unit 113 may be formed in a cylindrical shape. At this time, a diameter of the first dust separation unit 112 may be gradually reduced downward.

Alternatively, the first dust separation unit 112 may be formed in the cylindrical shape. In the embodiment, the shapes of the first dust separation unit 112 and the first dust storage unit 113 are not limited. However, a diameter of a lower portion of the first dust separation unit 112 may be smaller than that of an upper portion of the first dust storage unit 113.

The first dust separation unit 112 and the first dust storage unit 113 may be connected by a connection part 114 due to a diameter difference between the lower portion of the first dust separation unit 112 and the upper portion of the first dust storage unit 113. The connection part 114 may be horizontally disposed, or may be disposed to be inclined at an angle smaller than 90 degrees.

The first dust separation unit 112 may separate the dust from the air using a cyclone principle.

The air and the dust introduced into the first dust separation unit 112 flows along an inner circumferential surface of the first dust separation unit 112. When the air and the dust enter the first dust storage unit 113 from the first dust separation unit 112, a flow speed thereof is reduced, because the diameter of the first dust storage unit 113 is larger than that of the first dust separation unit 112, and thus the dust may be smoothly accumulated in the first dust storage unit 113.

The dust collecting apparatus 100 may further include a filter unit 120 which filters the air separated from the dust in the first dust separation unit 112.

The filter unit 120 may include a filter body 121, and one or more holes 122 which are formed at the filter body 121.

The filter body 121 may support a second dust separation unit 130 which will be described below. A support rib 123 which supports the second dust separation unit 130 may be provided at an upper side of the filter body 121. A rounded support groove 124 may be provided at the support rib 123.

The dust collecting apparatus 100 may further include the second dust separation unit 130 which suctions the air primarily separated from the dust by the first dust separation unit 112, and separates the dust from the suctioned air once more.

A part of the second dust separation unit 130 may be located inside the dust collecting body 110, and the other part thereof may be located outside the dust collecting body 110.

The second dust separation unit 130 may include a plurality of cyclone parts. The plurality of cyclone parts may include a plurality of first cyclone parts 131, and one or more second cyclone parts 133 located in an area formed by the plurality of first cyclone parts 131.

A cyclone flow axis of each of the plurality of first cyclone parts 131 may not be disposed in parallel with a cyclone flow axis of each of the one or more second cyclone parts 133.

For example, the cyclone flow axis of each of the second cyclone parts 133 may be disposed in parallel with a vertical line, and the cyclone flow axis of each of the plurality of first cyclone parts 131 may be disposed to be inclined with respect to the vertical line.

For example, the plurality of first cyclone parts 131 may be disposed in a ring shape. Since the plurality of first cyclone parts 131 are disposed in the ring shape, the one or more second cyclone parts 133 may be located in the area formed by the plurality of first cyclone parts 131.

According to the present invention, since the one or more second cyclone parts 133 are located among the plurality of first cyclone parts 131, the number of cyclone parts may be increased, and an amount of the air flowing through the second dust separation unit 130 may be increased, and thus dust separation performance in the second dust separation unit 130 may be enhanced.

That is, a fact that the amount of the flowing air is large means that the air flows smoothly, and when the air flows smoothly, air-dust separation performance in each cyclone part may be enhanced.

Also, in the present invention, since the one or more second cyclone parts 133 are located among the plurality of first cyclone parts 131, a size of the second dust separation unit 130 is prevented from being increased, and the second dust separation unit 130 becomes compact, even though the number of cyclone parts is increased.

Each of the cyclone parts 131 and 133 may include a second suction port 132 through which the air is suctioned.

The air passed through the filter unit 120 may be divided and may flow to the second suction port 132 of each of the cyclone parts 131 and 133. That is, the plurality of cyclone parts 131 and 133 may be disposed in parallel.

Each of the first cyclone parts 131 may be seated in the support groove 124 of the support rib 123 of the filter body 121. A part of each of the cyclone parts 131 and 133 may be accommodated in the filter body 121.

The second dust separation unit 130 may further include a supporter 136 which supports a filter device 170.

An air guide 137 which is inserted into each of the cyclone parts 131 and 133 and guides discharging of the air separated from the dust may be provided at the supporter 136.

Also, the second dust separation unit 130 may further include a dust discharge guide 138 which is provided at each of the cyclone parts 131 and 133 to guide discharging of the dust separated from the air. The dust discharged from each of the cyclone parts 131 and 133 may fall down through the dust discharge guide 138.

The dust collecting apparatus 100 may further include the filter device 170 which filters the air discharged from the second dust separation unit 130.

The filter device 170 may include a filter frame 172, and a filter 174 which is accommodated in the filter frame 172.

The filter frame 172 may be seated on the second dust separation unit 130. For example, the filter frame 172 may be seated on the supporter 136.

The dust collecting apparatus 100 may further include an exhaust cover 180. The exhaust cover 180 may be seated on an upper side of the second dust separation unit 130. The exhaust cover 180 may cover the filter device 170, while being seated on the second dust separation unit 130.

The exhaust cover 180 may include an air discharge port 182 through which the air is discharged. The air discharged from the air discharge port 182 may be introduced into the cleaner body 10.

A fastening part 184 for fastening to the second dust separation unit 130 may be provided at the exhaust cover 180. For example, the exhaust cover 180 may be fastened to the supporter 136 of the second dust separation unit 130.

The dust collecting apparatus 100 may further include a second dust storage unit 150 which stores the dust separated in the second dust separation unit 130.

At least a part of the second dust storage unit 150 may be located inside the first dust storage unit 113.

The second dust storage unit 150 may be connected to a lower side of the second dust separation unit 130. For example, the dust discharge guide 138 of the second dust separation unit 130 may be seated on an upper side of the second dust storage unit 150.

A part of the second dust storage unit 150 may be located inside the filter unit 120. For example, a part of the second dust storage unit 150 may be located inside the filter body 121.

The second dust storage unit 150 may include a dust introduction guide 151 which is located inside the filter body 121, connected to the dust discharge guide 138, and guides introduction of the dust, and a storage unit body 152 which extends downward from the dust introduction guide 151, and forms a space for storing the dust.

The storage unit body 152 may be formed in, for example, a cylindrical shape, and the dust introduction guide 151 may be formed in, for example, a cylindrical shape or a truncated cone shape.

A seating part 153 on which the second dust separation unit 130 is seated may be provided at the dust introduction guide 151. Also, a fastening part 154 for fastening to the second dust separation unit 130 may be provided at the dust introduction guide 151.

The dust collecting apparatus 100 may further include a compression device which compresses the dust stored in the first dust storage unit 113.

The compression device may include a pressing member 200 which is rotatably disposed in the first dust storage unit 113, and a fixing member 250 of which a position is fixed to an inside of the first dust storage unit 113.

And the pressing member 200 may be rotatably connected to the second dust storage unit 150.

The fixing member 250 may be integrally formed with the first dust storage unit 113, or may be coupled so that the position thereof is fixed to an inner circumferential surface of the first dust storage unit 113.

The pressing member 200 may be rotated in the first dust storage unit 113 in one direction or both directions, and the dust between the pressing member 200 and the fixing member 250 may be compressed, while the pressing member 200 is rotated.

The pressing member 200 may include a pressing plate support part 210 having a hollow 211, and a pressing plate 220 which is supported by the pressing plate support part 210.

The pressing plate 220 may be integrally formed with the pressing plate support part 210, or may be coupled to the pressing plate support part 210. The pressing plate 220 may extend radially from the pressing plate support part 210.

The second dust storage unit 150 may be located in the hollow 211 of the pressing plate support part 210. To this end, an outer diameter of the second dust storage unit 150 may be the same or smaller than an inner diameter of the pressing plate support part 210. FIG. 3 illustrates an example in which the outer diameter of the second dust storage unit 150 is smaller than the inner diameter of the pressing plate support part 210.

Therefore, the pressing plate support part 210 may be prevented from interfering with the second dust storage unit 150, while the pressing member 200 is rotated.

Also, since the second dust storage unit 150 is located in the hollow 211 of the pressing plate support part 210, the dust may be stored in the second dust storage unit 150, and also a volume or a size of the dust collecting apparatus 100 may be prevented from being increased due to the second dust storage unit 150.

One or more of the pressing plate 220 and the fixing member 250 may include one or more holes 222 through which the air between the pressing plate 220 and the fixing member 250 passes while the pressing plate 220 is rotated toward the fixing member 250. For example, a plurality of holes are provided at the pressing plate 220, and the plurality of holes may be disposed to be vertically and horizontally spaced apart from each other. That is, a plurality of rows of the holes may be provided at the pressing plate 220.

Since the air remaining in the first dust storage unit 113 may pass through the one or more holes 222 during a compression process, scattering of the dust due to rising of the air in the first dust storage unit 113 may be minimized, and a phenomenon that the dust backflows to the first dust separation unit 112 may be minimized.

The fixing member 250 may be located between the pressing plate support part 210 and the inner circumferential surface of the first dust storage unit 113. And the fixing member 250 may include a path forming part 251 which forms a path 252 between a part of the fixing member 250 and the inner circumferential surface of the first dust storage unit 113 so that the air flows therethrough.

The path forming part 251 may be disposed to be inclined at a predetermined angle with respect to a horizontal line, and may be formed in a linear shape or a rounded shape. That is, the path forming part 251 (a part of the fixing member) and the inner circumferential surface of the first dust storage unit 113 may form the path 252. Alternatively, the path forming part 251 may be a cut-away part formed by cutting away a part of the fixing member 250.

That is, the path 252 may be located between a surface of the fixing member 250 facing the pressing plate support part 210 and the inner circumferential surface of the first dust storage unit 113, and may enable the air to flow therethrough.

Due to the path forming part 251, only a part of the fixing member 250 among an entire height of the fixing member 250 may be in contact with the inner circumferential surface of the first dust storage unit 113. That is, a width of a portion of the fixing member 250 at which the path forming part 251 is formed may be formed smaller than that of a portion thereof at which the path forming part 251 is not formed. Also, a maximum width of the path 252 may be formed larger than a diameter of the hole 222. Also, an entire area of the plurality of holes 222 may be formed larger than an area of the path 252.

The path forming part 251 minimizes a phenomenon that the air between the pressing plate 220 and the fixing member 250 rises along an outer surface of the fixing member 250 when the pressing plate 220 is moved toward the fixing member 250. That is, since the air and the dust between the pressing plate 220 and the fixing member 250 pass through the path 252 formed by the path forming part 251, the phenomenon that the air and the dust rise along the outer surface of the fixing member 250 may be minimized.

At this time, to effectively prevent the rising of the air by the path 252 formed by the path forming part 251, it is preferable that the path forming part 251 be formed at an upper side of the fixing member 250.

When the air in the first dust storage unit 113 rises while the pressing plate 220 is rotated toward the fixing member 250, it may be difficult for the dust separated from the first dust separation unit 112 to be easily introduced toward the first dust storage unit 113.

Therefore, in the embodiment, to enable the dust separated from the first dust separation unit 112 to be easily introduced toward the first dust storage unit 113, a dust movement guide 129 is provided at a circumference of the filter body 121. The dust movement guide 129 is disposed at a lower side of the filter body 121, and is spirally formed along a circumference of an outer circumferential surface of the filter body 121.

And the dust movement guide 129 may extend from the filter body 121 so as to be gradually inclined downward toward an outside. That is, the dust movement guide 129 extends from the filter body 121 to be inclined downward based on a cross section of the dust movement guide 129.

And at least a part of the dust movement guide 129 may be located inside the first dust storage unit 113, and may be spaced apart from each of the inner circumferential surfaces of the first dust separation unit 112 and the first dust storage unit 113.

Therefore, according to the present invention, the dust separated from the first dust separation unit 112 may be stably moved downward along the dust movement guide 129, and then may be stored in the first dust storage unit 113.

Meanwhile, the dust movement guide 129 may serve as a flow restriction part which restricts a flow of the rising air and dust when the air in the first dust storage unit 113 rises. At this time, at least a part of the dust movement guide 129 may be located lower than the connection part 114.

Also, the connection part 114 formed by a difference in the diameter between the first dust separation unit 112 and the first dust storage unit 113 may also serve as the flow restriction part which restricts the flow of the rising air and dust when the air in the first dust storage unit 113 rises.

When the air rises in the first dust storage unit 113, the air may generally rise along the inner circumferential surface of the first dust storage unit 113. The connection part 114 serves as a flow resistor of the air which rises along the inner circumferential surface of the first dust storage unit 113, changes a flow direction of at least some of the rising air, and enables at least some of the rising air to flow again to the first dust storage unit 113.

Meanwhile, the dust collecting apparatus 100 may further include a cover assembly 300 which opens and closes the first dust storage unit 113 and the second dust storage unit 150 at the same time.

The cover assembly 300 may include a first cover 310 which opens and closes the first dust storage unit 113. The first cover 310 may be connected to a lower side of the dust collecting body 110. At this time, the first cover 310 may be separably connected to the lower side of the dust collecting body 110, or may be rotatably connected to the lower side of the dust collecting body 110 by a hinge.

The first cover 310 may include a first coupling rib 311 and a second coupling rib 312 for coupling to the dust collecting body 110.

Each of the first coupling rib 311 and the second coupling rib 312 may extend upward from an upper surface of the first cover 310, and may be formed in a ring shape. And the first coupling rib 311 and the second coupling rib 312 may be spaced apart from each other. The lower side of the dust collecting body 110 may be inserted into a gap between the first coupling rib 311 and the second coupling rib 312.

Therefore, according to the embodiment, since the lower side of the dust collecting body 110 is inserted into the gap between the first coupling rib 311 and the second coupling rib 312, a separate sealing member is not required.

The cover assembly 300 may further include a transmission device which transmits power transmitted from an outside to the pressing member 200.

The transmission device may include a first transmission unit 330 and a second transmission unit 340.

The first transmission unit 330 may be disposed at one side of the first cover 310, and the second transmission unit 340 may be disposed at the other side of the first cover 310. For example, at least a part of the first transmission unit 330 may be disposed at a lower side of the first cover 310, and at least a part of the second transmission unit 340 may be disposed at an upper side of the first cover 310.

The first transmission unit 330 may be connected to a driving device which will be described below. The second transmission unit 340 may be connected to the pressing member 200.

An opening 314 through which one or more of the first transmission unit 330 and the second transmission unit 340 pass may be provided at the first cover 310.

The cover assembly 300 may further include a transmission unit cover 320 which covers the first transmission unit 330.

The transmission unit cover 320 may be fastened to the first cover 310. To this end, a first fastening hole 315 may be formed at the first cover 310, and a second fastening hole 325 may be formed at the transmission unit cover 320. At this time, the transmission unit cover 320 may be fastened to the lower side of the first cover 310.

The transmission unit cover 320 may include a support part 322 which supports the first transmission unit 330. The support part 322 may be formed by recessing downward a part of the transmission unit cover 320.

A shaft 326 which passes through the first transmission unit 330 may be provided at the support part 322. The first transmission unit 330 may be rotated about the shaft 326. The shaft 326 may also pass through the second transmission unit 340.

The transmission unit cover 320 may further include an exposure part 324 which exposes the first transmission unit 330 to an outside. For example, the exposure part 324 may be a cut-away part which is formed by cutting away a part of the first transmission unit 330.

The cover assembly 300 may further include a second cover 350 which opens and closes the second dust storage unit 150. While the second dust storage unit 150 is covered by the second cover 350, the second cover 350 may be located inside the pressing plate support part 210 of the pressing member 200.

When the second cover 350 is located inside the pressing plate support part 210, interference between the pressing plate support part 210 and the second cover 350 may be prevented, and also the pressing plate support part 210 may serve as a sealing wall.

To prevent the dust in the second dust storage unit 150 from leaking to an outside of the second dust storage unit 150, a sealing member 360 may be coupled to the second cover 350 or the second dust storage unit 150. FIG. 3 illustrates an example in which the sealing member 360 is coupled to the second dust storage unit 150.

Figure 7:
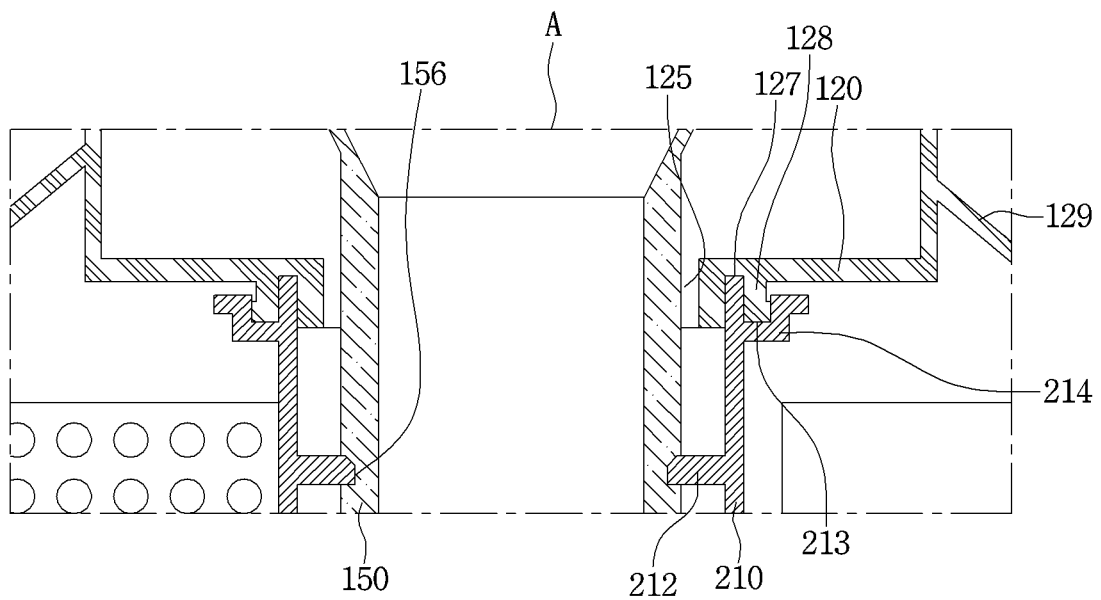
FIG. 7 is an enlarged view of an A portion of FIG. 3.

FIG. 7 is an enlarged view of an A portion of FIG. 3.

Referring to FIGS. 3 and 7, a hole 125 through which the second dust storage unit 150 passes may be formed at the filter unit 120.

An accommodation groove 127 in which an upper end of the pressing plate support part 210 of the pressing member 200 is inserted may be formed at a lower side of the filter unit 120. A wall supporter 214 having an accommodation groove 213 which accommodates a wall 128 forming the accommodation groove 127 while the pressing plate support part 210 is accommodated in the accommodation groove 127 may be provided at the pressing plate support part 210.

Therefore, since the upper end of the pressing plate support part 210 is inserted into the accommodation groove 127 of the filter unit 120, and the wall 128 extending from the filter unit 120 is inserted into the accommodation groove 213 of the wall supporter 214, a double sealing structure is formed, and thus the dust in the first dust storage unit 113 may be prevented from being introduced between the pressing plate support part 210 and the second dust storage unit 150.

That is, in the present invention, the accommodation grooves 127 and 213, the wall 128 and the wall supporter 214 may be referred to as a sealing device.

Since the dust is prevented from being introduced between the pressing plate support part 210 and the second dust storage unit 150, the pressing plate support part 210 may be prevented from being not smoothly rotated by the dust between the pressing plate support part 210 and the second dust storage unit 150.

A coupling protrusion 212 may be formed at one of an inner circumferential surface of the pressing plate support part 210 and an outer circumferential surface of the second dust storage unit 150, and a coupling groove 156 in which the coupling protrusion 212 is inserted may be formed at the other one. The coupling protrusion 212 may be elastically deformed while the second dust storage unit 150 is being inserted into the pressing plate support part 210, and may be inserted into the coupling groove 156, when being aligned with the coupling groove 156.

As another example, a coupling pin which is formed separately from the pressing plate support part 210 and the second dust storage unit 150 may pass through the pressing plate support part 210 from an outside of the pressing plate support part 210, and then may be inserted into the coupling groove 156 formed at the second dust storage unit 150. Alternatively, the coupling pin which is formed separately from the pressing plate support part 210 and the second dust storage unit 150 may pass through the pressing plate support part 210 from an inside of the second dust storage unit 150, and then may be inserted into the coupling groove 156 formed at the pressing plate support part 210.

At this time, in any case, to enable the pressing plate support part 210 to be rotated while the pressing plate support part 210 is connected to the second dust storage unit 150, the coupling groove 156 is formed in a ring shape in a circumferential direction of the pressing plate support part 210 or the second dust storage unit 150.

According to the embodiment, since the pressing plate support part 210 is maintained in a state of being coupled to the second dust storage unit 150 while the cover assembly 300 is separated from the dust collecting body 110, the pressing member 200 is maintained in a state of being located inside the first dust storage unit 113. That is, while the cover assembly 300 is separated from the dust collecting body 110, the pressing member 200 may be prevented from being separated from the dust collecting body 110.

Figure 8:
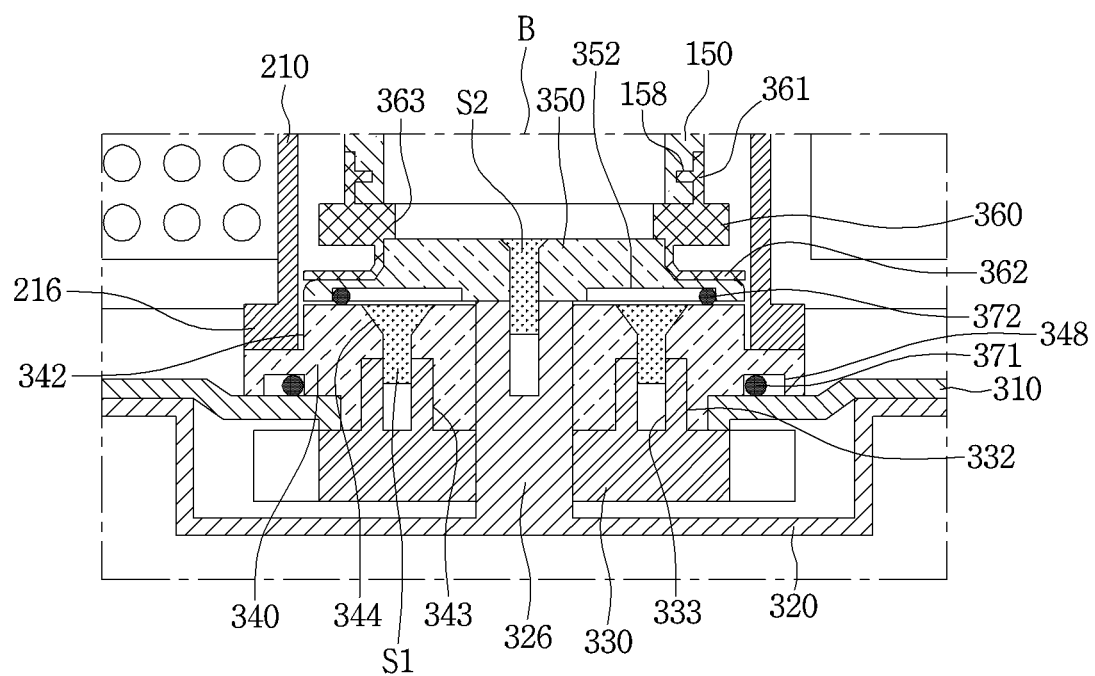
FIG. 8 is an enlarged view of a B portion of FIG. 3.

FIG. 8 is an enlarged view of a B portion of FIG. 3.

Referring to FIGS. 3, 5 and 8, the sealing member 360 may be coupled to a lower side of the second dust storage unit 150. The sealing member 360 may include a coupling part 361 for coupling to the second dust storage unit 150, and a groove 158 in which a part of the coupling part 361 is inserted may be formed at the outer circumferential surface of the second dust storage unit 150. The sealing member 360 may surround a circumference of the second dust storage unit 150.

As another example, the coupling part 361 may be inserted into the second dust storage unit 150 in a fitting method.

The sealing member 360 may further include a seating part 362 which is seated on an upper side of the second cover 350 while the cover assembly 300 is coupled to the dust collecting body 110. The seating part 362 may be in surface contact with the second cover 350, and may surround an outer circumference of the second cover. In another aspect, a part of the second cover 350 may be inserted into the sealing member 360.

A through-hole 363 through which the dust in the second dust storage unit 150 passes may be formed at the sealing member 360. Therefore, some of the dust in the second dust storage unit 150 may be accumulated on the second cover 350.

For example, the sealing member 360 may be formed of a material which is able to be deformed. For example, the sealing member 360 may be formed of a rubber material.

According to the embodiment, since the sealing member 360 is in surface contact with the second cover 350, and surrounds the circumference of the second cover 350, the dust stored in the second dust storage unit 150 may be prevented from leaking to an outside of the second dust storage unit 150.

The first transmission unit 330 may include an insertion part 332 which is inserted into the second transmission unit 340, and the second transmission unit 340 may include an accommodation part 343 in which the insertion part 332 is inserted.

A fastening groove 333 to which a fastening member S1 passed through a fastening hole 344 of the second transmission unit 340 is fastened may be formed at the insertion part 332.

Therefore, when the first transmission unit 330 is rotated, the second transmission unit 340 may also be rotated together.

To transmit a rotational force of the second transmission unit 340 to the pressing plate support part 210, one of the pressing plate support part 210 and the second transmission unit 340 may include a transmitting protrusion 216, and the other one may include an accommodation groove 342 in which the transmitting protrusion 216 is accommodated.

FIG. 8 illustrates an example in which the transmitting protrusion 216 is formed at the pressing plate support part 210, and the accommodation groove 342 is formed at the second transmission unit 340. In this case, for example, the transmitting protrusion 216 may protrude from an outer circumferential surface of the pressing plate support part 210. To accommodate the transmitting protrusion 216 protruding from the outer circumferential surface of the pressing plate support part 210 in the accommodation groove 342 of the second transmission unit 340, a part of the second transmission unit 340 may be inserted into the pressing plate support part 210.

As another example, the transmitting protrusion 216 may protrude downward from a lower surface of the pressing plate support part 210. In this case, while a part of the second transmission unit 340 is not accommodated in the pressing plate support part 210, the transmitting protrusion 216 may be accommodated in the accommodation groove 342 of the second transmission unit 340.

The second cover 350 may be fastened to the shaft 326 of the transmission unit cover 320 by a fastening member S2. Therefore, even though the first transmission unit 330 and the second transmission unit 340 are rotated, the second cover 350 may be maintained in a stopped state.

To prevent the dust and the air in the first dust storage unit 113 from leaking to an outside through between the second transmission unit 340 and the first cover 310, a first sealing part 371 may be provided at one or more of the second transmission unit 340 and the first cover 310. For example, the first sealing part 371 may be an O-ring.

For example, FIG. 8 illustrates an example in which the first sealing part 371 is provided at the second transmission unit 340. In this case, a first groove 348 which accommodates the first sealing part 371 may be provided at the second transmission unit 340.

A second sealing part 372 may be provided at a portion of the second cover 350 facing the second transmission unit 340. For example, the second sealing part 372 may be an O-ring.

The second sealing part 372 may prevent the air and dust in the first dust storage unit 113 from passing through a gap between the second cover 350 and the second transmission unit 340.

Also, the second sealing part 372 may prevent the air and the dust, which may exist between the second dust storage unit 150 and the pressing plate support part 210, from passing through the gap between the second cover 350 and the second transmission unit 340.

Figure 9:
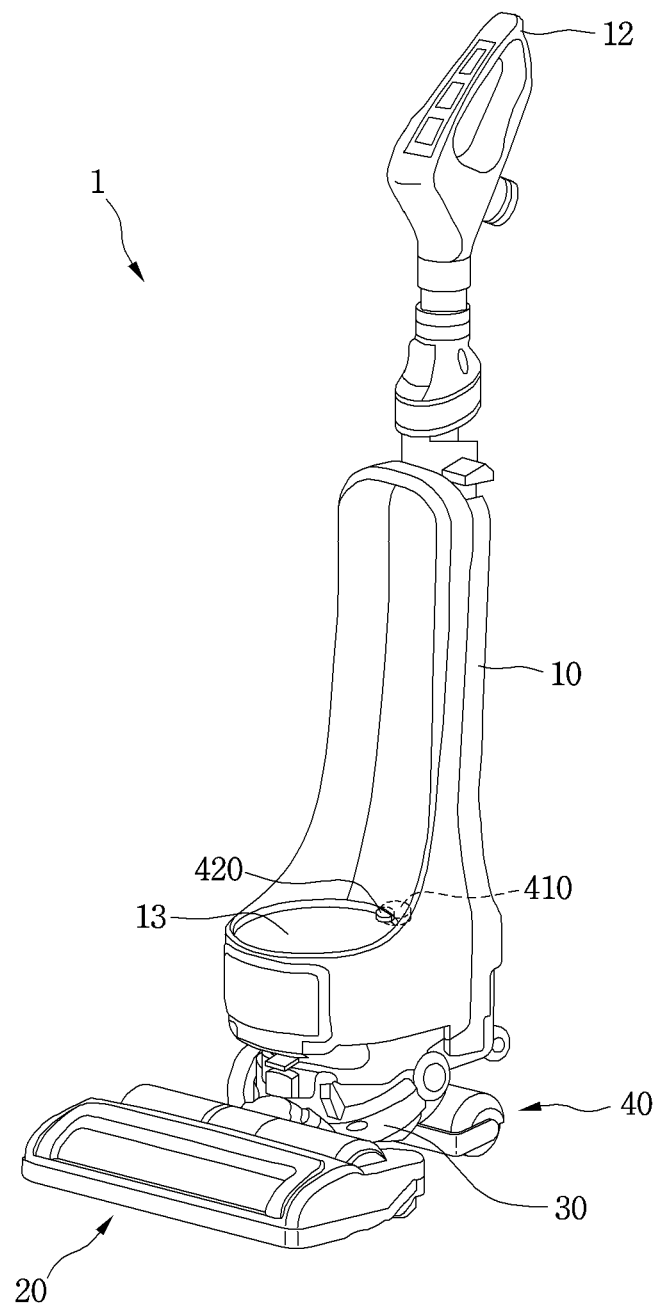
FIG. 9 is a view illustrating a state in which the dust collecting apparatus is separated from the vacuum cleaner of FIG. 1.

FIG. 9 is a view illustrating a state in which the dust collecting apparatus is separated from the vacuum cleaner of FIG. 1.

Referring to FIGS. 5 and 9, the cleaner body 10 may include driving devices 410 and 420 which drive the pressing member 200. The driving devices 410 and 420 may include a driving motor 410, and a driving gear 420 which is connected to the driving motor 410.

An installation part 13 at which the dust collecting apparatus 100 is installed may be provided at the cleaner body 10, and the driving gear 420 may be exposed to the installation part 13.

The driving gear 420 may transmit power of the driving motor 410 to the first transmission unit 330. For example, to enable the first transmission unit 330 to receive the power of the driving motor 410 from the driving gear 420, the first transmission unit 330 may be a gear.

When the dust collecting apparatus 100 is installed at the installation part 13 of the cleaner body 10, the first transmission unit 330 may be connected to the driving gear 420. However, when the dust collecting apparatus 100 is separated from the cleaner body 10, connection between the first transmission unit 330 and the driving gear 420 may be released.

Figure 10:
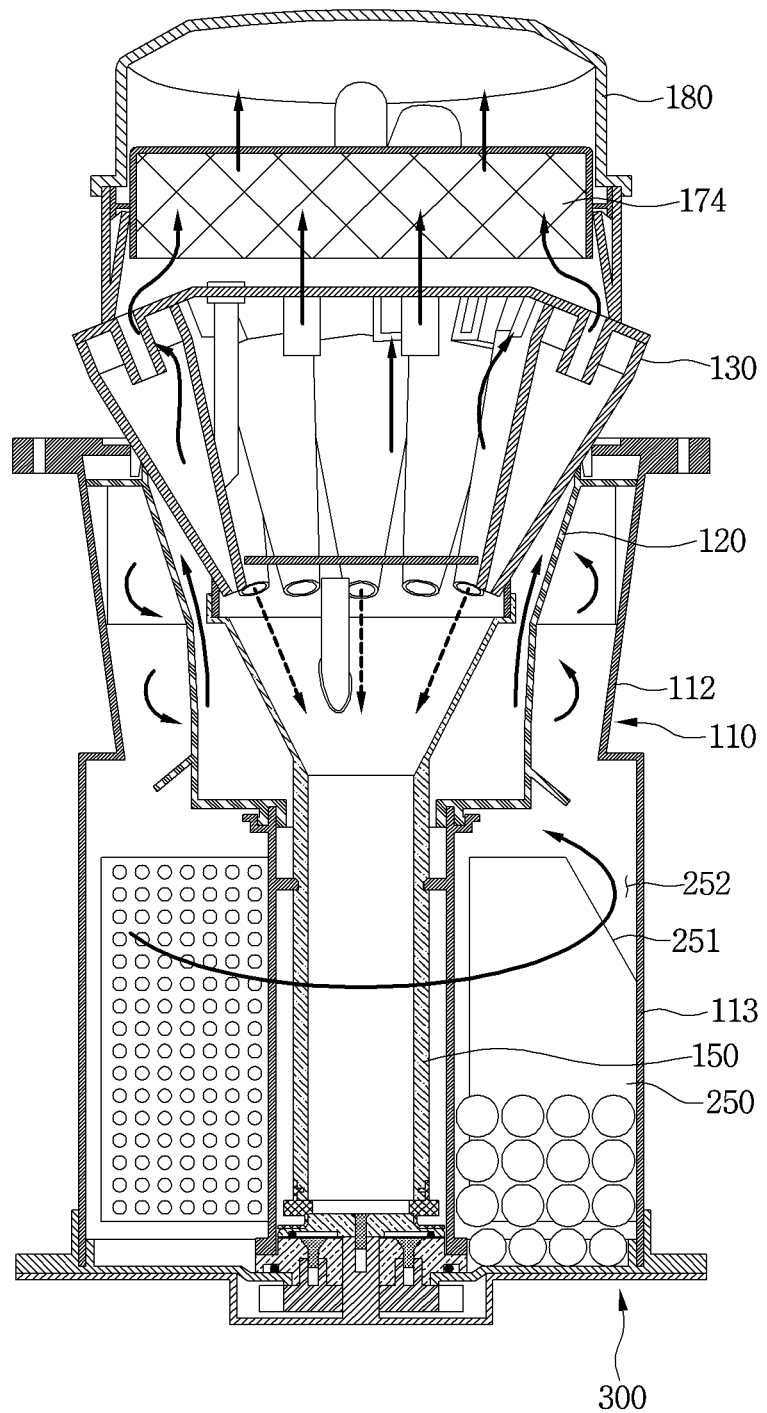
FIG. 10 is a view illustrating a state in which air and dust are moved in the dust collecting apparatus according to the first embodiment of the present invention.

FIG. 10 is a view illustrating a state in which the air and the dust are moved in the dust collecting apparatus according to the first embodiment of the present invention.

Referring to FIGS. 1 to 10, when the suction motor provided at the cleaner body 10 is operated, the air and the dust are suctioned through the suction nozzle 20 by the suction force of the suction motor. The air and the dust suctioned through the suction nozzle 20 pass through the supporter 30, and then are introduced into the cleaner body 10. The dust and the air flowing through the cleaner body 10 are introduced into the dust collecting apparatus 100.

That is, the air and the dust are introduced into the dust collecting apparatus 100 through the first suction port 111 of the dust collecting apparatus 100. The air and the dust passed through the first suction port 111 are introduced into the first dust separation unit 112, and the air and the dust introduced into the first dust separation unit 112 are separated from each other by a cyclone flow.

The dust primarily separated from the air is moved downward, and stored in the first dust storage unit 113. However, the air separated from the dust rises after passing through the hole 122 of the filter unit 120, and is introduced into the second dust separation unit 130 through the second suction port 132 of the second dust separation unit 130. That is, the air passed through a dust separation process in the first dust separation unit 112 is divided and flows to the plurality of first cyclone parts 131 and the one or more second cyclone parts 133.

The air introduced into the second dust separation unit 130 is separated again from the dust in a cyclone flow process. The dust (referring to a dotted line) separated from the air in the second dust separation unit 130 is discharged from the second dust separation unit 130, and then stored in the second dust storage unit 150.

However, the air separated from the dust in the second dust separation unit 130 is discharged from each of the cyclone parts 131 and 133 through the air guide 137.

The air discharged from each of the cyclone parts 131 and 133 passes through the filter 174, and is finally discharged from the dust collecting apparatus 100 through the air discharge port 182 of the exhaust cover 180. The air discharged from the dust collecting apparatus 100 may be introduced into the cleaner body 10, and then may be discharged to an outside of the cleaner body 10.

Meanwhile, while the suction motor is being operated, the driving motor 410 may be operated. When the driving motor 410 is operated, the driving gear 420 may be rotated in one direction. When the driving gear 420 is rotated in one direction, the first transmission unit 330 may be rotated in the other direction by a rotational force of the driving gear 420.

Then, the second transmission unit 340 may be rotated in the same direction as that of the first transmission unit 330, and the pressing member 200 may be rotated in the same direction as that of the second transmission unit 340.

The dust (the dust in the first dust storage unit) between the fixing member 250 and the pressing plate 220 of the pressing member 200 may be compressed by rotation of the pressing member 200.

Therefore, according to the embodiment, since the dust stored in the first dust storage unit may be compressed by the pressing member, a volume of the dust stored in the first dust storage unit may be reduced, and a dust storage capacity of the first dust storage unit may be increased, and since the dust is stored in the first storage unit in a compressed state, the dust may be prevented from being scattered in a dust discharging process.

Also, in a rotating process of the pressing member 200, the air between the pressing plate 220 and the fixing member 250 may pass through the path 252. Therefore, the phenomenon that the air and the dust between the pressing plate 220 and the fixing member 250 rise along the outer surface of the fixing member 250 while the pressing plate 220 compresses the dust may be minimized.

In the rotating process of the pressing member 200, a rotating direction of the pressing member 200 may be changed. Since a method for changing the rotating direction of the pressing member 200 may be realized by a well-known technique, a detailed description thereof will be omitted.

Figure 11:
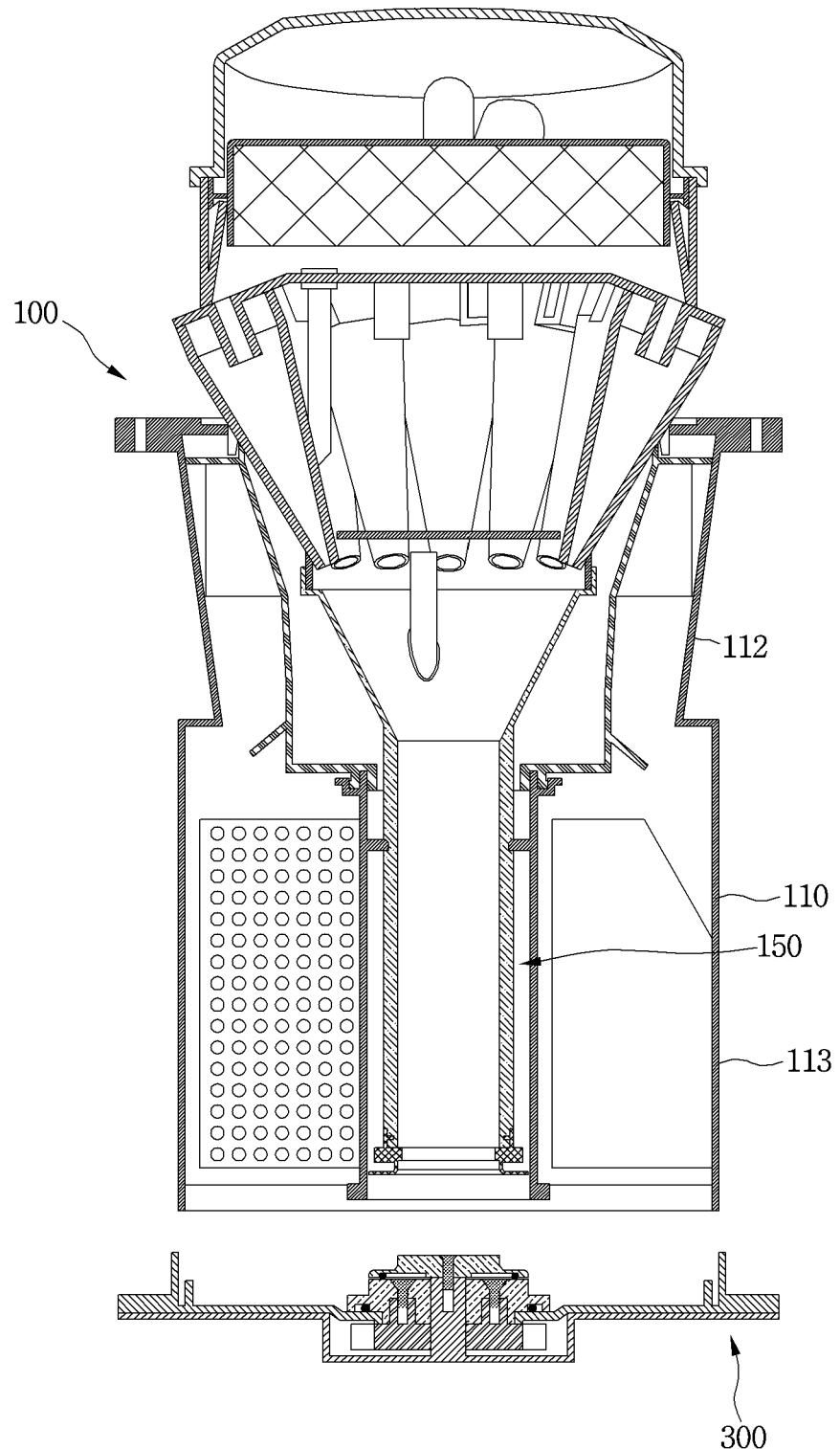
FIG. 11 is a view illustrating a state in which a cover assembly is separated from the dust collecting apparatus according to the first embodiment of the present invention.

FIG. 11 is a view illustrating a state in which the cover assembly is separated from the dust collecting apparatus according to the first embodiment of the present invention.

Referring to FIG. 11, to empty out the dust stored in the first dust storage unit 113 and the second dust storage unit 150, the cover assembly 300 may be separated from the dust collecting apparatus 100.

Then, the dust stored in the first dust storage unit 113 and the second dust storage unit 150 may fall to a lower side of the dust collecting body 110. As described above, while the cover assembly 300 is separated from the dust collecting apparatus 100, the pressing member 200 is maintained in a state of being located in the first dust storage unit 113.

Figure 12:
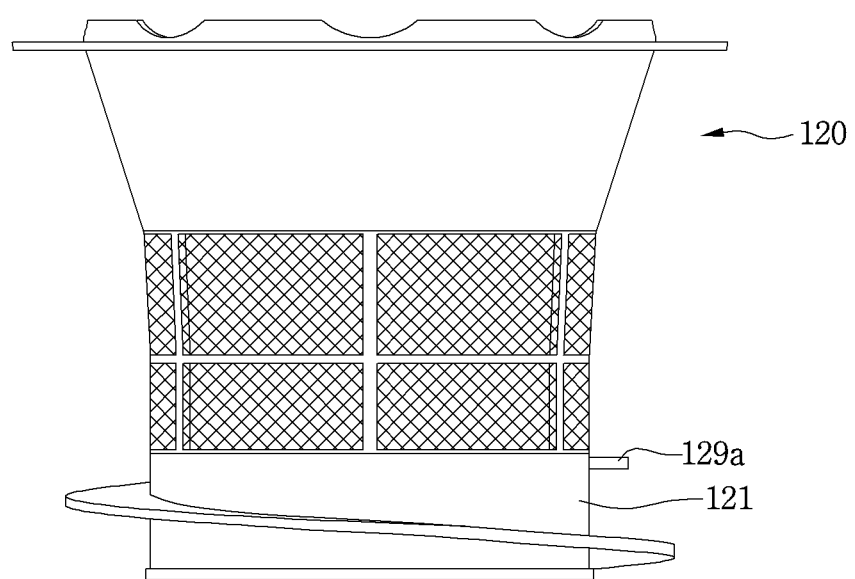
FIG. 12 is a view of a filter unit according to a second embodiment of the present invention.

FIG. 12 is a view of a filter unit according to a second embodiment of the present invention.

The embodiment is the same as the first embodiment, except the dust movement guide. Therefore, hereinafter, only characteristic portions of the embodiment will be described.

Referring to FIG. 12, a filter unit 120 according to the embodiment may include a dust movement guide 129a which extends from a circumference of a filter body 121.

The dust movement guide 129a may be disposed at a lower side of the filter body 121, and may be spirally formed along an outer circumferential surface of the filter body 121.

And the dust movement guide 129a may extend vertically from the filter body 121. That is, a horizontal cross section of the dust movement guide 129a may extend in parallel with a horizontal line.

By the embodiment, the dust separated in the first dust separation unit 112 may be stably moved downward along the dust movement guide 129a, and then may be stored in the first dust storage unit 113.

Also, the dust movement guide 129a of the embodiment may also serve as the flow restriction part described in the first embodiment.

Figure 13:
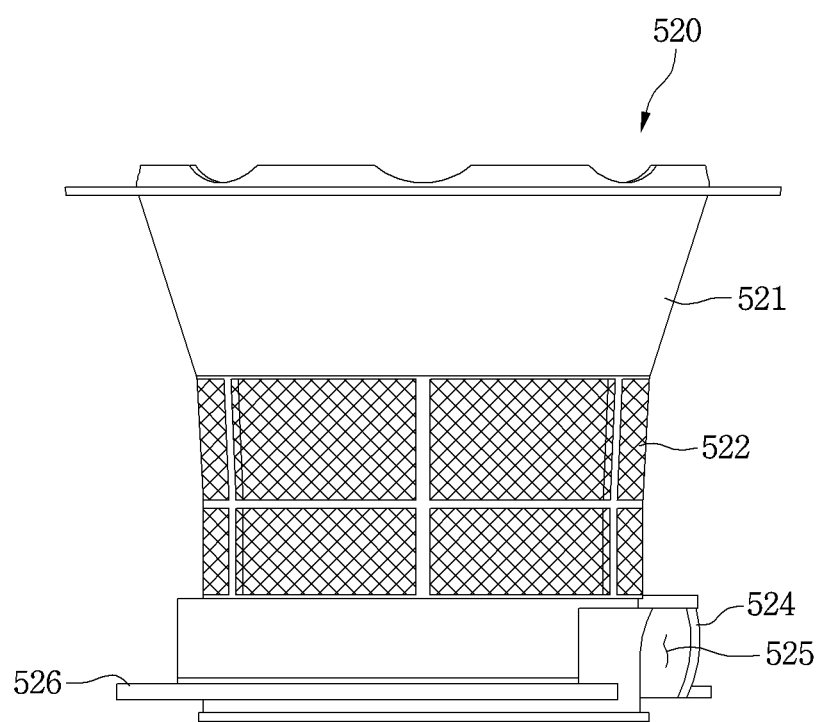
FIG. 13 is a view illustrating a filter unit according to a third embodiment of the present invention.

FIG. 13 is a view illustrating a filter unit according to a third embodiment of the present invention.

The embodiment is the same as the first embodiment, except the dust movement guide. Therefore, hereinafter, only characteristic portions of the embodiment will be described.

Referring to FIG. 13, a filter unit 520 according to the embodiment may include a filter body 521 having one or more holes 522.

Basic performance of the filter body 521 of the embodiment is the same as that of the filter body 121 of the first embodiment.

The filter unit 520 may include a dust movement guide 524 which surrounds a circumference of the filter body 521 while being spaced apart from an outer circumferential surface of the filter body 521. Therefore, the dust movement guide 524 and the outer circumferential surface of the filter body 521 form a dust path 525 through which the dust flows.

Therefore, the dust separated in the first dust separation unit may flow through the dust path 525 formed by the dust movement guide 524, and may fall down.

A flow restriction part 526 which restricts rising of the dust and the air in the first dust storage unit 113 may be provided at a lower end of the dust movement guide 524. The flow restriction part 526 may extend from the lower end of the dust movement guide 524 in a direction which is distant from the filter body 521.

According to the embodiment, since the dust movement guide 524 forms the dust path 525, the dust in the dust path 525 may not be affected by the air in the first dust storage unit 113, and may be smoothly moved downward.

Figure 14:
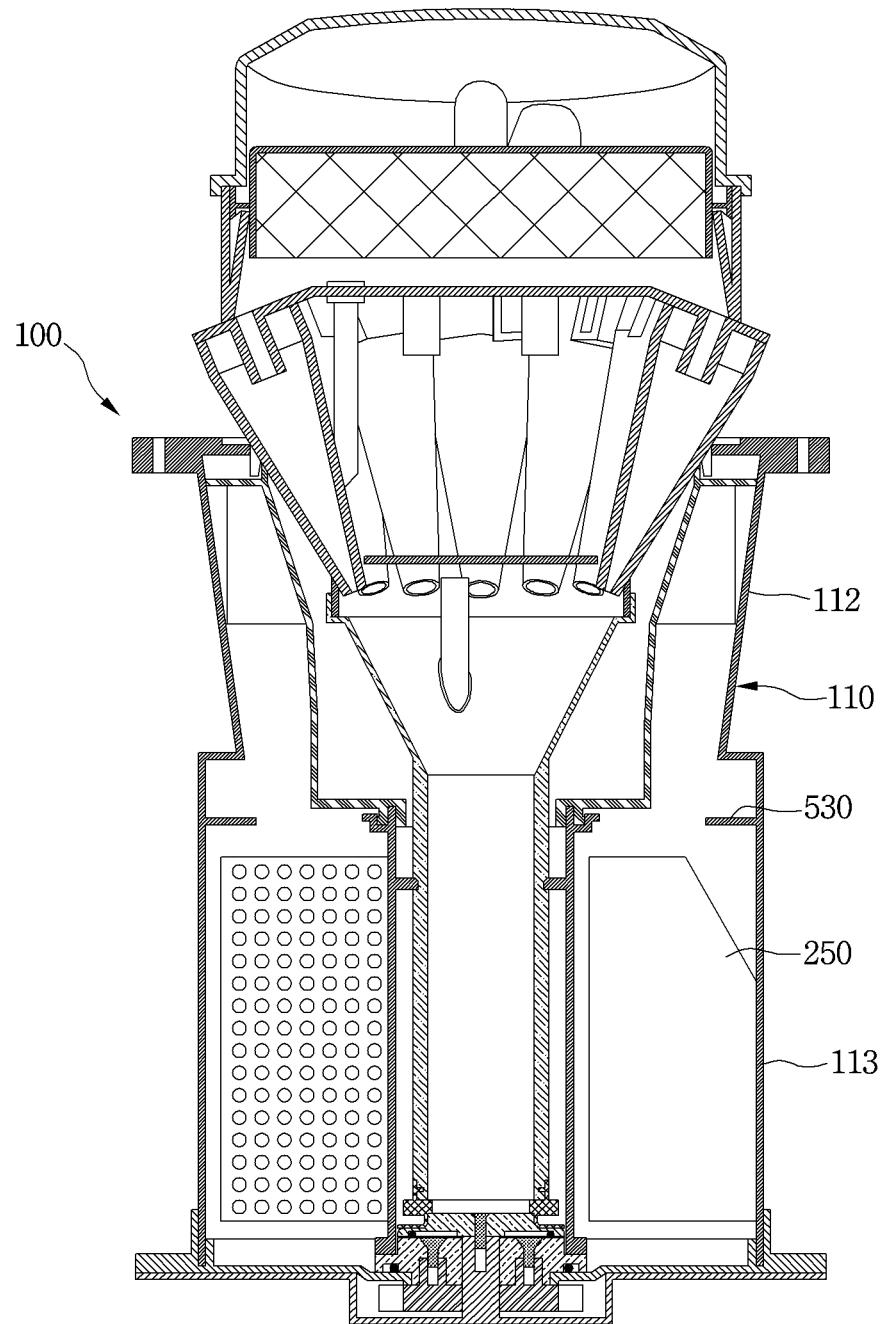
FIG. 14 is a cross-sectional view of a dust collecting apparatus unit according to a fourth embodiment of the present invention.
Figure 15:
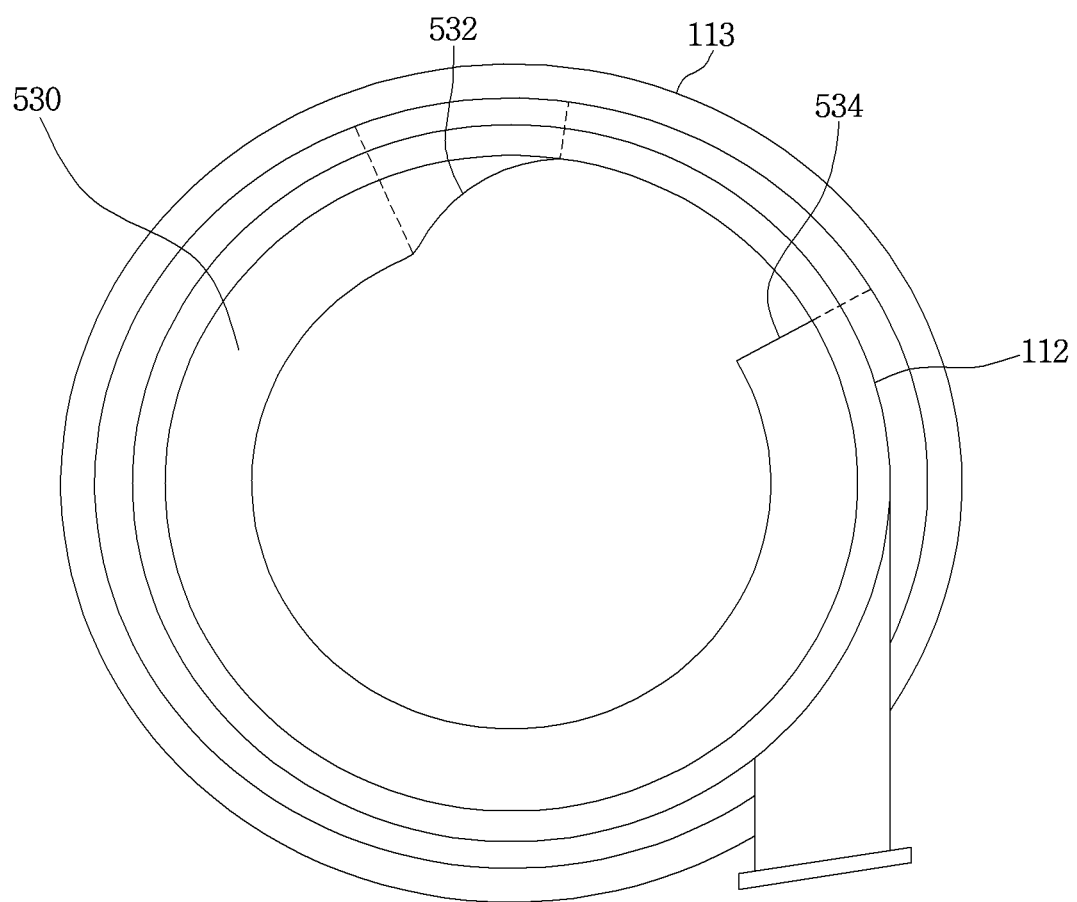
FIG. 15 is a plan view of a dust collecting body illustrating a dust movement guide of FIG. 14.

FIG. 14 is a cross-sectional view of a dust collecting apparatus unit according to a fourth embodiment of the present invention, and FIG. 15 is a plan view of a dust collecting body illustrating a dust movement guide of FIG. 14.

The embodiment is the same as the first embodiment, except a position of the dust movement guide. Therefore, hereinafter, only characteristic portions of the embodiment will be described.

Referring to FIGS. 14 and 15, a first dust storage unit 113 according to the embodiment may include a dust movement guide 530.

The dust movement guide 530 may guide the dust separated in the first dust separation unit 112 to be smoothly moved to a lower side of the first dust storage unit 113.

The dust movement guide 530 may be integrally formed with an inner circumferential surface of the first dust storage unit 113, or may be coupled to the inner circumferential surface of the first dust storage unit 113. The dust movement guide 530 may protrude from the inner circumferential surface of the first dust storage unit 113.

And the dust movement guide 530 may extend from the inner circumferential surface of the first dust storage unit 113 by a predetermined length in a circumferential direction. The dust movement guide 530 may be located higher than the fixing member 250 and the pressing plate 220.

The dust movement guide 530 may include a first guide 532 which initially guides the dust moved to the first dust storage unit 113. The first guide 532 may extend from the inner circumferential surface of the first dust storage unit 113 to vertically be inclined.

The dust movement guide 530 may include a falling end 534 which enables the dust flowing along the dust movement guide 530 to fall down. The falling end 534 may be spaced apart from the first guide 532, and may be located lower than the first guide 532.

The dust moved to the first dust storage unit 113 is moved to an upper surface of the dust movement guide 530 by the first guide 532, and the dust flowing along the upper surface of the dust movement guide 530 may fall down from the dust movement guide 530 by the falling end 534.

Since the dust movement guide 530 is provided at the inner circumferential surface of the first dust storage unit 113, the dust movement guide 530 may serve as a flow restriction part which restricts rising of the air in the first dust storage unit 113.

Figure 16:
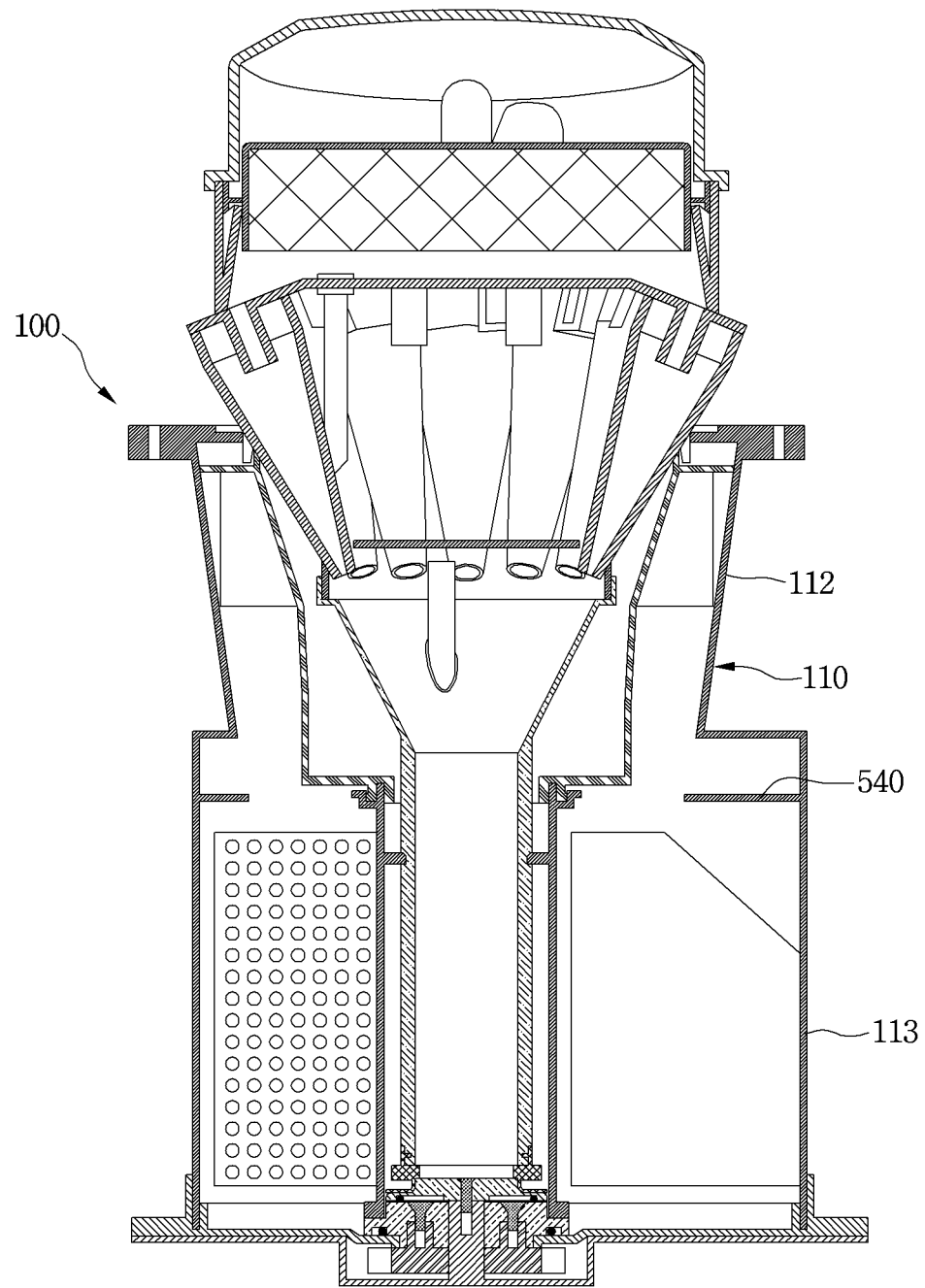
FIG. 16 is a cross-sectional view of a dust collecting apparatus according to a fifth embodiment of the present invention.
Figure 17:
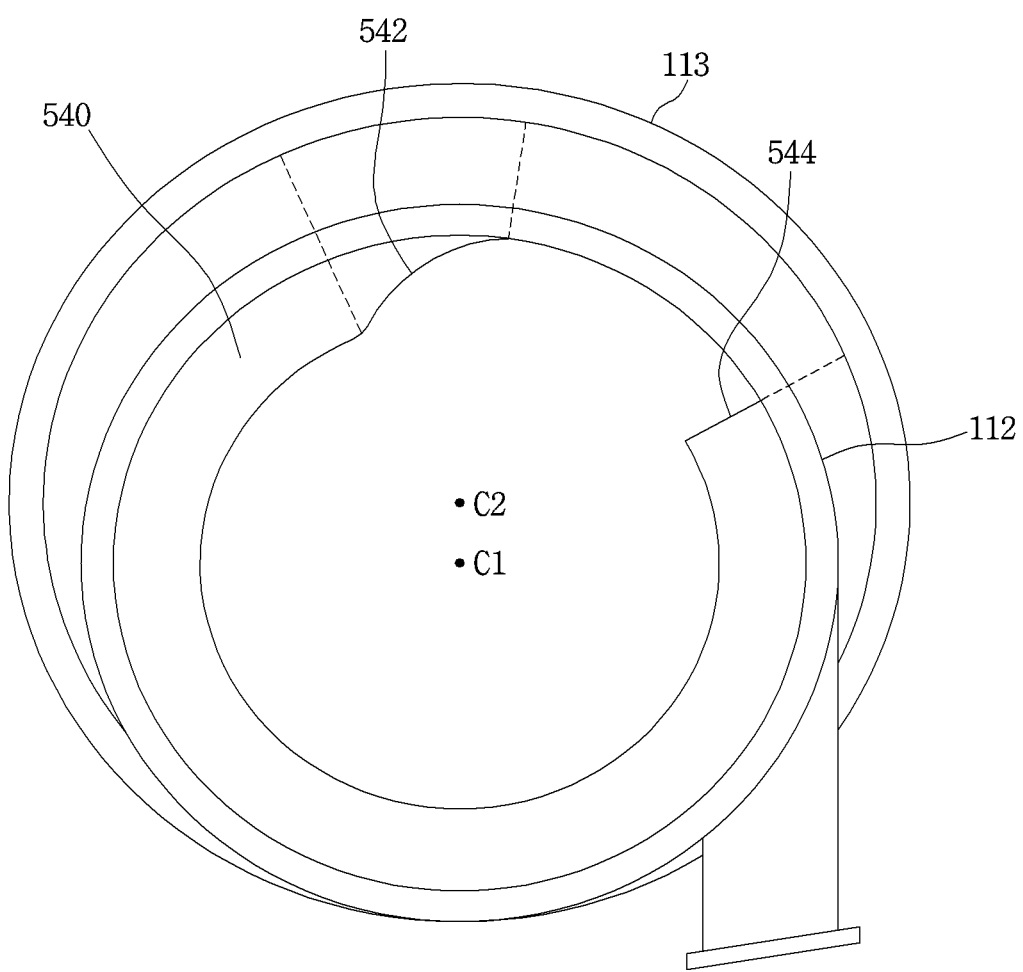
FIG. 17 is a plan view of a dust collecting body illustrating a dust movement guide of FIG. 16.

FIG. 16 is a cross-sectional view of a dust collecting apparatus according to a fifth embodiment of the present invention, and FIG. 17 is a plan view of a dust collecting body illustrating a dust movement guide of FIG. 16.

The embodiment is the same as the fourth embodiment, except sizes of the dust separation unit and the dust storage unit. Therefore, hereinafter, only characteristic portions of the embodiment will be described.

Referring to FIGS. 16 and 17, a vertical center C1 of the first dust separation unit 112 according to the embodiment may be eccentric with respect to a vertical center C2 of the first dust storage unit 113.

The first dust storage unit 113 may include a dust movement guide 540.

The dust movement guide 540 may guide the dust separated in the first dust separation unit 112 to be smoothly moved to a lower side of the first dust storage unit 113.

The dust movement guide 540 may be integrally formed with an inner circumferential surface of the first dust storage unit 113, or may be coupled to the inner circumferential surface of the first dust storage unit 113. And the dust movement guide 540 may extend from the inner circumferential surface of the first dust storage unit 113 by a predetermined length in a circumferential direction. The dust movement guide 540 may be located higher than the fixing member 250 and the pressing plate 220.

The dust movement guide 540 may include a first guide 542 which initially guides the dust moved to the first dust storage unit 113. The first guide 542 may extend from the inner circumferential surface of the first dust storage unit 113 to vertically be inclined.

The dust movement guide 540 may include a falling end 544 which enables the dust flowing along the dust movement guide 540 to fall down. The falling end 544 may be spaced apart from the first guide 542, and may be located lower than the first guide 542.

The dust moved to the first dust storage unit 113 is moved to an upper surface of the dust movement guide 540 by the first guide 542, and the dust flowing along the upper surface of the dust movement guide 540 may fall down from the dust movement guide 540 by the falling end 544.

Since the dust movement guide 540 is provided at the inner circumferential surface of the first dust storage unit 113, the dust movement guide 540 may serve as a flow restriction part which restricts rising of the air in the first dust storage unit 113. At this time, at least a part of the dust movement guide 540 may be disposed to be vertically overlapped with the fixing member.

Figure 18:
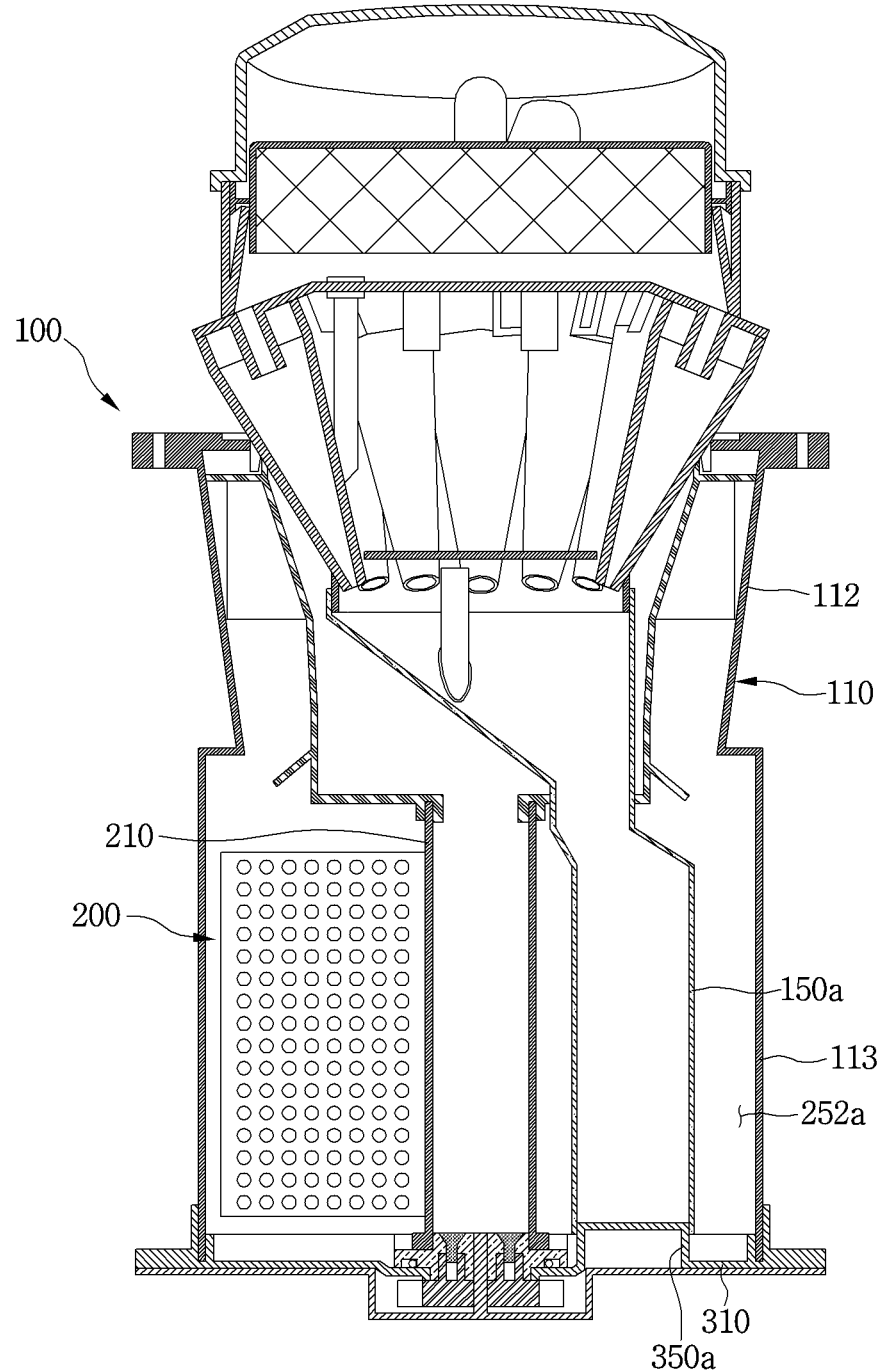
FIG. 18 is a cross-sectional view of a dust collecting apparatus according to a sixth embodiment of the present invention.

FIG. 18 is a cross-sectional view of a dust collecting apparatus according to a sixth embodiment of the present invention.

The embodiment is the same as the first embodiment, except a position of the second dust storage unit. Therefore, hereinafter, only characteristic portions of the embodiment will be described.

Referring to FIG. 18, a dust collecting apparatus 100 of the embodiment may include a dust collecting body 110. The dust collecting body 110 may include a first dust separation unit 112, and a first dust storage unit 113 which is located under the first dust separation unit 112.

A second dust storage unit 150a may be located at the first dust storage unit 113. At this time, the second dust storage unit 150a may be located between a pressing plate support part 210 and an inner circumferential surface of the first dust storage unit 113.

The second dust storage unit 150a may be spaced apart from the pressing plate support part 210. The second dust storage unit 150a may be spaced apart from the inner circumferential surface of the first dust storage unit 113.

According to the embodiment, the second dust storage unit 150a may serve as the fixing member in the first embodiment. In other words, the fixing member may serve as the second dust storage unit which stores the dust.

In this case, an outer surface of the second dust storage unit 150a may serve as a path forming part. And the entire outer surface of the second dust storage unit 150a may be spaced apart from the inner circumferential surface of the first dust storage unit 113.

Since the second dust storage unit 150a is spaced apart from the inner circumferential surface of the first dust storage unit 113, a path 252a may be formed between the outer surface of the second dust storage unit 150a and the inner circumferential surface of the first dust storage unit 113.

The dust collecting apparatus 100 may further include a first cover 310 which opens and closes the first dust storage unit 113 and the second dust storage unit 150a at the same time. A cover part 350a which covers the second dust storage unit 150a may be provided at the first cover 310. The cover part 350a may protrude upward from the first cover 310, and may be inserted into the second dust storage unit 150a.

The specification has described that the dust collecting apparatus includes the first dust separation unit, the second dust separation unit, the first dust storage unit and the second dust storage unit. However, unlike this, the description of the shape of the dust collecting body, the dust movement guide provided at the filter unit, the path formed by the fixing member, and the dust movement guide provided at the first dust storage unit may also be equally applied to a case in which the dust collecting apparatus includes one dust separation unit and one dust storage unit.

Even though all the elements of the embodiments are coupled into one or operated in the combined state, the present disclosure is not limited to such an embodiment. That is, all the elements may be selectively combined with each other without departing the scope of the invention. Furthermore, when it is described that one comprises (or includes or has) some elements, it should be understood that it may comprise (or include or have) only those elements, or it may comprise (or include or have) other elements as well as those elements if there is no specific limitation. Unless otherwise specifically defined herein, all terms comprising technical or scientific terms are to be given meanings understood by those skilled in the art. Like terms defined in dictionaries, generally used terms needs to be construed as meaning used in technical contexts and are not construed as ideal or excessively formal meanings unless otherwise clearly defined herein.

Although embodiments have been described with reference to a number of illustrative embodiments thereof, it will be understood by those skilled in the art that various changes in form and details may be made therein without departing from the spirit and scope of the invention as defined by the appended claims. Therefore, the preferred embodiments should be considered in descriptive sense only and not for purposes of limitation, and also the technical scope of the invention is not limited to the embodiments. Furthermore, is defined not by the detailed description of the invention but by the appended claims, and all differences within the scope will be construed as being comprised in the present disclosure.

What is claimed is:

1. A vacuum cleaner comprising:
   a first cyclone configured to primarily separate dust from suctioned air;
   a first dust storage unit configured to store the dust separated in the first cyclone;
   a pressing member configured to compress the dust stored in the first dust storage unit, and having a pressing plate support part, and a pressing plate supported by the pressing plate support part;
   a second cyclone configured to separate again the dust from the air passed through a dust separation process in the first cyclone; and
   a second dust storage unit disposed between the pressing plate support part and an inner circumferential surface of the first dust storage unit,
   wherein:
      the pressing member is rotated in the first dust storage unit in at least one direction, and the dust between the pressing member and the second dust storage unit is compressed while the pressing member is rotated,
      the first cyclone includes a filter body to support the second cyclone,
      the second cyclone includes a dust discharge guide provided to receive dust separated from the air in the second cyclone,
      the vacuum cleaner further comprises a dust introduction guide which is connected to the dust discharge guide and is located inside and extends through a portion of the filter body to guide dust from the second cyclone to the second dust storage unit,
      the dust introduction guide includes a fastening extension configured to be fastened to the second cyclone, and
      the second dust storage unit is horizontally spaced from a rotational axis of the pressing member.

2. The vacuum cleaner of claim 1, wherein the second dust storage unit is spaced apart from the inner circumferential surface of the first dust storage unit such that a path is defined between the outer surface of the second dust storage unit and the inner circumferential surface of the first dust storage unit.

3. The vacuum cleaner of claim 1, wherein the second dust storage unit is spaced apart from the pressing plate support part and a path is defined between the outer surface of the second dust storage unit and the pressing plate support part.

4. The vacuum cleaner of claim 1, further comprising a first cover configured to open and close the first dust storage unit and the second dust storage unit.

5. The vacuum cleaner of claim 4, wherein the first cover includes a cover part protruded upward from the first cover and inserted into the second dust storage unit.

6. The vacuum cleaner of claim 1, wherein the pressing plate is in contact with the second dust storage unit during rotation of the pressing plate.

7. The vacuum cleaner of claim 1, wherein a diameter of an upper portion of the first dust storage unit is larger than a diameter of a lower portion of the first cyclone.

8. The vacuum cleaner of claim 1, wherein the dust introduction guide extends through a lower surface of the filter body.

9. The vacuum cleaner of claim 1, wherein the first cyclone further includes a dust movement guide that is formed on an outer circumference surface of the filter body and is configured to guide dust to the first dust storage unit.

* * * * *